United States Patent
Barada et al.

(10) Patent No.: US 6,859,678 B1
(45) Date of Patent: Feb. 22, 2005

(54) METHOD AND APPARATUS FOR MANUFACTURING MAGNETORESISTIVE ELEMENT, SOFTWARE AND SYSTEM FOR CONTROLLING MANUFACTURING OF MAGNETORESISTIVE ELEMENT, SOFTWARE FOR ESTIMATING RESISTANCE VALUE OF MAGNETORESISTIVE ELEMENT, AND COMPUTER SYSTEM

(75) Inventors: Kazuhiro Barada, Tokyo (JP); Masao Yamaguchi, Tokyo (JP); Masahiro Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 1053 days.

(21) Appl. No.: 09/592,291

(22) Filed: Jun. 12, 2000

(30) Foreign Application Priority Data

Jun. 21, 1999 (JP) .......................................... 11-173684

(51) Int. Cl.$^7$ ............................................. G06F 19/00
(52) U.S. Cl. ...................................................... 700/121
(58) Field of Search ................. 700/108–110, 117–121, 700/173–177

(56) References Cited

U.S. PATENT DOCUMENTS

| | | | |
|---|---|---|---|
| 4,914,868 A | | 4/1990 | Church et al. ................... 451/5 |
| 5,203,119 A | | 4/1993 | Cole ............................ 451/11 |
| 5,210,667 A | * | 5/1993 | Zammit ....................... 360/316 |
| 5,463,805 A | * | 11/1995 | Mowry et al. ............. 29/603.09 |
| 5,531,017 A | * | 7/1996 | Church et al. ............ 29/603.12 |
| 5,559,429 A | * | 9/1996 | Mowry et al. ............. 324/71.5 |
| 5,632,669 A | * | 5/1997 | Azarian et al. ................ 451/54 |
| 5,708,370 A | * | 1/1998 | Shibata et al. ................ 324/699 |
| 6,047,224 A | * | 4/2000 | Stover et al. ................ 700/119 |
| 6,183,594 B1 | * | 2/2001 | Nazzal .................... 156/345.25 |
| 6,193,584 B1 | * | 2/2001 | Rudy et al. ..................... 451/5 |
| 6,347,983 B1 | * | 2/2002 | Hao et al. ...................... 451/57 |
| 6,370,763 B1 | * | 4/2002 | Watanuki et al. ......... 29/603.09 |
| 6,532,646 B2 | * | 3/2003 | Watanuki .................. 29/603.12 |

FOREIGN PATENT DOCUMENTS

| | | |
|---|---|---|
| JP | 02-95572 | 4/1990 |
| JP | 09-293214 | 11/1997 |
| JP | 10-269530 | 10/1998 |
| JP | 11-000863 | 1/1999 |
| JP | A 11-134614 | 5/1999 |
| JP | A 11-138389 | 5/1999 |

* cited by examiner

Primary Examiner—Maria N. Von Buhr
(74) Attorney, Agent, or Firm—Oliff & Berridge, PLC

(57) ABSTRACT

Provided are a method and an apparatus for manufacturing a magnetoresistive element and a method and an apparatus for manufacturing a magnetic head which can reduce variation in properties of an magnetoresistive element and variation in the median of distribution.

Before starting polishing, wafer information containing various types of factors in a wafer stage which may have an influence on a resistance value of a final MR film is obtained, and an S value is calculated from the information by using a statistical scheme. During a polishing step, ongoing-work-information containing various types of factors in a polishing stage which may have an influence on the resistance value of the final MR film is obtained at regular intervals. A K value is calculated from the information by using the statistical scheme. Then, an MR resistance estimate during the polishing step is calculated from the S value and the K value. When the MR resistance estimate reaches a target resistance value , polishing is stopped.

38 Claims, 13 Drawing Sheets

FIG.3A
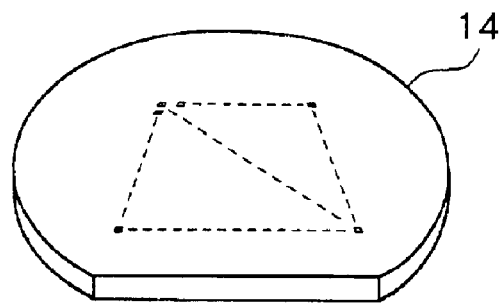
FIG.3B
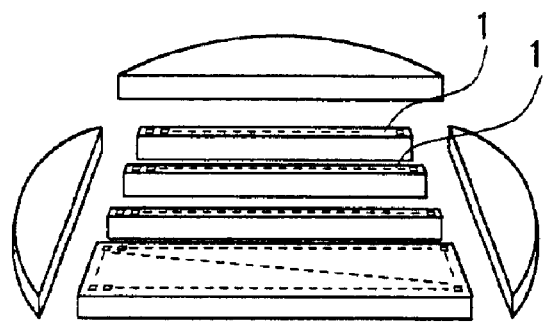
FIG.3C
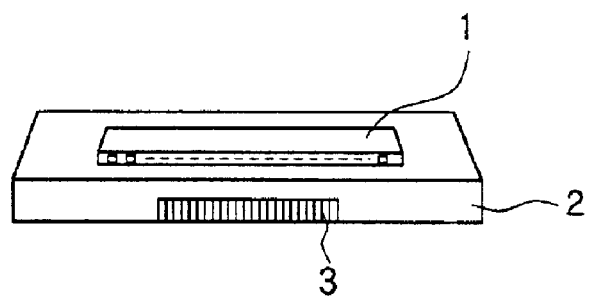
FIG.3D
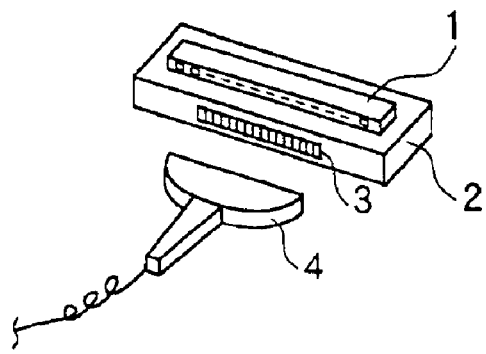

FIG.4A
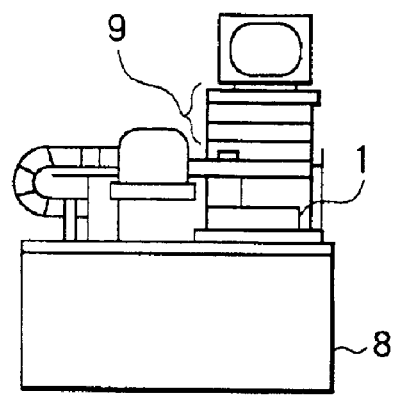
FIG.4B
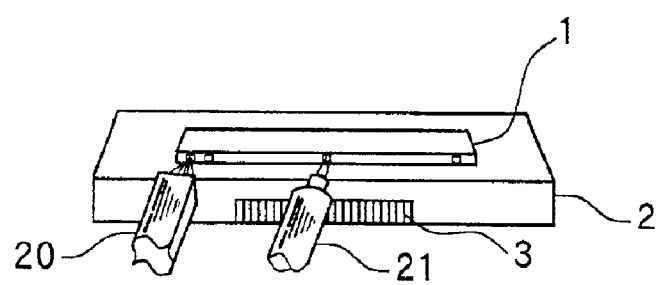
FIG.4C
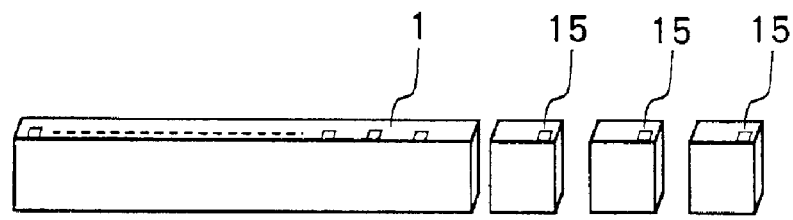

|  |  | Variable |  |
| --- | --- | --- | --- |
| Wafer information | S1 | ROWNO | Bar number |
|  | S2 | IMAVG | Average of M sensor resistance during integration in bar |
|  | S3 | IMRNG | Range of M sensor resistance during integration in bar |
|  | S4 | R1AVG | Average of RLG sensor resistance R1 during integration in bar |
|  | S5 | R1STD | Standard deviation of RLG sensor resistance R1 during integration in bar |
|  | S6 | R2AVG | Average of RLG sensor resistance R2 during integration in bar |
|  | S7 | R2STD | Standard deviation of RLG sensor resistance R2 during integration in bar |
|  | S8 | R3AVG | Average of RLG sensor resistance R3 during integration in bar |
|  | S9 | R3STD | Standard deviation of RLG sensor resistance R3 during integration in bar |
|  | S10 | IMRRAVG | Average of resistance of MR element during integration in bar |
|  | S11 | IMRRSTD | Standard deviation of resistance of MR element during integration in bar |
|  | S12 | LDRAVG | Average of lead resistance in bar |
|  | S13 | LDRSTD | Standard deviation of lead resistance in bar |
|  | S14 | SheetRAVG | Average of sheet resistance in bar |
|  | S15 | SheetRSTD | Standard deviation of sheet resistance in bar |
|  | S16 | SVRAVG | Average of C+S×W resistance in bar |
|  | S17 | SVRSTD | Standard deviation of C+S×W resistance in bar |
| Information during working | K1 | FMRHAVG | Average of MR heights during RLG working in bar |
|  | K2 | FRLGAVG | Average of RLG sensor resistance during RLG working in bar |
|  | K3 | FMAVG | Average of M sensor resistance during RLG working in bar |

FIG.8

|  | Variable name | Variance ratio | Partial regression coefficient |
|---|---|---|---|
| $C_0$ | Constant term | 20.7201 | −23.036 |
| $C_1$ | ROWNO | 25.6668 | −0.005 |
| $C_2$ | IMAVG | 31.7809 | −2.155 |
| $C_3$ | IMRNG | 36.1613 | 1.764 |
| $C_4$ | R1AVG | 83.4616 | 6.029 |
| $C_5$ | R1STD | 6.9186 | −2.435 |
| $C_6$ | R2AVG | 151.3326 | −5.134 |
| $C_7$ | R2STD | 4.5411 | 1.077 |
| $C_8$ | R3AVG | 0.253 | 0 |
| $C_9$ | R3STD | 0.8593 | 0 |
| $C_{10}$ | IMRRAVG | 539.3231 | 7.116 |
| $C_{11}$ | IMRRSTD | 0.4357 | 0 |
| $C_{12}$ | LDRAVG | 0.069 | 0 |
| $C_{13}$ | LDRSTD | 1.6833 | 0 |
| $C_{14}$ | SheetRAVG | 3.1087 | 0.617 |
| $C_{15}$ | SheetRSTD | 18.3665 | −0.281 |
| $C_{16}$ | SVRAVG | 0.0505 | 0 |
| $C_{17}$ | SVRSTD | 0.0015 | 0 |
| $D_1$ | FMRHAVG | 3.092 | 5.66 |
| $D_2$ | FRLGAVG | 158.4078 | 0.114 |
| $D_3$ | FMAVG | 155.6401 | 0.212 |

FIG.9

METHOD AND APPARATUS FOR MANUFACTURING MAGNETORESISTIVE ELEMENT, SOFTWARE AND SYSTEM FOR CONTROLLING MANUFACTURING OF MAGNETORESISTIVE ELEMENT, SOFTWARE FOR ESTIMATING RESISTANCE VALUE OF MAGNETORESISTIVE ELEMENT, AND COMPUTER SYSTEM

BACKGROUND OF THE INVENTION

1. Field of the Invention

The invention relates to a method and an apparatus for manufacturing a magnetic transducer having properties of changing in electrical resistance in response to an external magnetic field, a method and an apparatus for manufacturing a magnetic head having a magnetic transducer, software and system for controlling manufacturing of a magnetic transducer, and software for estimating resistance value of such a magnetic transducer, and computer system.

2. Description of the Related Art

Recently, an improvement in performance of a thin film magnetic head has been sought in accordance with an increase in a surface recording density of a hard disk drive. A composite thin film magnetic head, which has a stacked structure comprising a recording head having an inductive magnetic transducer for writing and a reproducing head having a magnetoresistive (hereinafter referred to as MR) element for reading, is widely used as the thin film magnetic head.

The MR element utilizes an MR film changing in electrical resistance in response to an external magnetic field. MR elements include an AMR element utilizing an anisotropic magnetoresistive (AMR) effect, a GMR element utilizing a giant magnetoresistive (GMR) effect, and so on. The reproducing head using the AMR element is called an AMR head or simply an MR head, and the reproducing head using the GMR element is called a GMR head. The AMR head is used as the reproducing head whose surface recording density exceeds 1 gigabit per square inch, and the GMR head is used as the reproducing head whose surface recording density exceeds 3 gigabits per square inch.

Methods of improving the performance of the reproducing head include a method in which a pattern width of the MR film, particularly, an MR height is made appropriate, and so on. The MR height refers to a length (height) of the MR element between the end thereof close to an air bearing surface and the opposite end thereof. The MR height is controlled in accordance with an amount of polishing of the air bearing surface. Incidentally, the air bearing surface refers to the surface of the thin film magnetic head facing a magnetic recording medium (a disk medium) and is sometimes called a track surface.

This type of thin film magnetic head is manufactured through the following steps as proposed in Japanese Patent Application Laid-open No. Hei 11-863, for example.

First, a large number (a large number of sets) of head cores, each of which includes a reproducing head using an MR element and a magnetic induction type recording head, and thin film structures such as dummy sensors are formed on a wafer (a substrate) made of, for example, a predetermined ceramic material by a thin film process using photolithography or the like. The dummy sensor is used for monitoring in order to control dimensions and performance of the MR element.

Then, the wafer is cut into a plurality of rectangular bars, each of which includes a plurality (a plurality of sets) of head cores and dummy sensors, by the use of a dicing saw or the like.

Then, a plurality of bars thus obtained is set on a polishing apparatus or the like, the cut surfaces thereof (the surfaces which are to be finally the air bearing surfaces) are polished, and polishing is stopped when the MR height of the MR element reaches a predetermined target dimension. The term "a predetermined target dimension" generally refers to a target value predefined as a dimension capable of delivering electromagnetic performance required for the reproducing head.

For example, Japanese Patent Application Laid-open No. Hei 2-96572 proposes a method which includes: directly measuring resistance values of a plurality of MR elements formed on the bar; calculating a mean value of the resistance values; and stopping polishing the bar when the mean value reaches a value within a predetermined range, not a method which includes controlling the timing of stopping polishing the cut surface of the bar while measuring the MR height. Incidentally, the polished bar is further cut into separate head sliders.

However, the method in which polishing is controlled until a mechanical dimension value of the MR height reaches the target value has a problem. Although the thin film magnetic head is manufactured with the intention of obtaining the MR element having predetermined electromagnetic performance, variation or an error out of predetermined tolerance is often detected when electromagnetic properties of the manufactured MR element are measured. When the electromagnetic properties of the MR elements of many thin film magnetic heads finally obtained are measured and the mean value of the electromagnetic properties is calculated, the mean value is sometimes out of predetermined tolerance. This problem is considered to arise because in forming the MR film on the wafer, a change in various conditions for photolithography or film forming or the like causes variation in a thickness or pattern width of the formed MR film according to an inter-wafer or in-wafer position.

The method, in which polishing of bars is controlled by measuring the resistance values of the bars during polishing and monitoring the mean value of the resistance values, theoretically allows the mean of the resistance values of the MR films of the bars under polishing to be within a predetermined range of numerical values. Even if the resistance value of the MR film is within tolerance, the method cannot, however, ensure that the MR height is within tolerance. Incidentally, not only the resistance value of the MR film but also the MR height is specified because too small an MR height may cause a phenomenon such as electro migration and thus cause damage to the MR film.

As described above, a problem has heretofore existed: variation in the resistance value or the dimension (MR height) of the MR element of the thin film magnetic head finally obtained occurs, and therefore the thin film magnetic head which does not fulfill required specifications is disadvantageously manufactured.

The invention is designed to overcome the foregoing problems. It is an object of the invention to provide a method and an apparatus for manufacturing a magnetic transducer and a method and an apparatus for manufacturing a magnetic head which make it possible to fulfill specifications for predetermined magnetic reproducing by reducing variation in electromagnetic properties of an MR element finally obtained and variation of the median of distribution.

SUMMARY OF THE INVENTION

According to a first aspect of the invention, a method for manufacturing a magnetic transducer having a magneto-sensitive layer changing in electrical resistance in response to an external magnetic field comprises: a film forming step of selectively forming at least a magneto-sensitive layer on a predetermined substrate; a substrate information obtaining step of obtaining information about at least either the substrate or a structure including at least the magneto-sensitive layer formed on the substrate, as substrate information before polishing; a cutting step of cutting the substrate into a plurality of bars each including at least the magneto-sensitive layer; and a polishing step of polishing the bars, wherein the polishing step controls polishing of the bar based on at least the substrate information so that the magneto-sensitive layer included in the bar has a predetermined target resistance value.

In the method for manufacturing a magnetic transducer, a plurality of bars each including at least the magneto-sensitive layer is cut from the base, and each of the bars is polished. The polishing step controls polishing of the bar based on at least the substrate information so that the magneto-sensitive layer included in the bar has the predetermined target resistance value. The "substrate information" contains all information about the substrate itself in a stage before starting polishing or the structure on the substrate. The "stage before starting polishing" contains not only a stage before the cutting step but also a stage before the polishing step after the cutting step. The substrate information contains, for example, information for identifying the substrate itself, information for identifying the bars cut from the substrate, information about various types of films formed on the substrate, and so on.

A method for manufacturing a magnetic transducer according to the first aspect of the invention may further comprise: a step of calculating a first value constituting a part of a potential estimated resistance value of the magneto-sensitive layer by subjecting the substrate information to a predetermined operation using values previously subjected to statistical processing as weighting coefficients, wherein the polishing step calculates the estimated resistance value by using at least the first value and controls polishing of the bar so that the estimated resistance value reaches the target resistance value.

In the method for manufacturing a magnetic transducer, the first value constituting a part of the estimated resistance value of the magneto-sensitive layer is obtained by the predetermined operation using the substrate information and the weighting coefficients obtained through the statistical processing, and the estimated resistance value is calculated by using the first value. Polishing of the bar is controlled so that the estimated resistance value reaches the target resistance value.

In a method for manufacturing a magnetic transducer according to the first aspect of the invention, the substrate information obtaining step may obtain at least either a resistance value or sheet resistance value of the magneto-sensitive layer made on the substrate or a virtual resistance value of the magneto-sensitive layer containing a crowding resistance component as well, whereby the substrate information contains data about at least either the obtained resistance value or sheet resistance value of the magneto-sensitive layer or the obtained virtual resistance value of the magneto-sensitive layer.

In a method for manufacturing a magnetic transducer according to the first aspect of the invention, the deposition step may further form at least either a leading conductive film to be electrically connected to the magneto-sensitive layer or at least one resistance film pattern for functioning as a dummy, and the substrate information obtaining step may obtain the resistance value of at least either the leading conductive film or the resistance film pattern made on the substrate, whereby the substrate information contains data about at least either the obtained resistance value of the leading conductive film or the obtained resistance value of the resistance film pattern.

In a method for manufacturing a magnetic transducer according to a second aspect of the invention, in addition to the first aspect, the polishing step further obtains information about the bar under working as ongoing-work-information and controls polishing of the bar based on both of the substrate information and the ongoing-work-information so that the magneto-sensitive layer included in the bar has a predetermined target resistance value.

In the method for manufacturing a magnetic transducer, the ongoing-work-information about the bar under polishing is obtained, and polishing of the bar is controlled based on both of the ongoing-work-information and the substrate information so that the magneto-sensitive layer included in the bar has the predetermined target resistance value. The "ongoing-work-information" contains all information about the bar itself under working and the structure formed on the bar under working.

A method for manufacturing a magnetic transducer according to the second aspect of the invention may further comprise: a step of calculating a first value constituting a part of a potential estimated resistance value of the magneto-sensitive layer by subjecting the substrate information to a predetermined operation using values previously subjected to statistical processing as weighting coefficients, wherein the polishing step calculates the estimated resistance value by using the first value and the ongoing-work-information and controls polishing of the bar so that the estimated resistance value reaches the target resistance value.

In the method for manufacturing a magnetic transducer, the first value constituting a part of the estimated resistance value of the magneto-sensitive layer is obtained by the predetermined operation using the substrate information and the weighting coefficients obtained through the statistical processing, and the estimated resistance value is calculated by using the first value and the ongoing-work-information. Polishing of the bar piece is controlled so that the estimated resistance value reaches the target resistance value.

In this case, the method for manufacturing a magnetic transducer can further comprise: a step of calculating a second value constituting a part of the estimated resistance value by subjecting the ongoing-work-information to a predetermined operation using values previously subjected to statistical processing as weighting coefficients, wherein the polishing step calculates the estimated resistance value by using the first value and the second value and controls polishing of the bar so that the estimated resistance value reaches the target resistance value.

In the method for manufacturing a magnetic transducer, the second value constituting a part of the estimated resistance value of the magneto-sensitive layer is obtained by the predetermined operation using the ongoing-work-information and the weighting coefficients obtained through the statistical processing, and the estimated resistance value is calculated by using the first value and the second value. Polishing of the bar is controlled so that the estimated resistance value reaches the target resistance value.

In a method for manufacturing a magnetic transducer according to the second aspect of the invention, the substrate information obtaining step may further obtain at least either a resistance value or sheet resistance value of the magneto-sensitive layer made on the substrate or a virtual resistance value of the magneto-sensitive layer containing a crowding resistance component as well, whereby the substrate information contains data about at least either the obtained resistance value or sheet resistance value of the magneto-sensitive layer or the obtained virtual resistance value of the magneto-sensitive layer.

In a method for manufacturing a magnetic transducer according to the second aspect of the invention, the film forming step may further form at least either a leading conductive film to be electrically connected to the magneto-sensitive layer or at least one resistance film pattern for functioning as a dummy, and the base information obtaining step may obtain the resistance value of at least either the leading conductive film or the resistance film pattern made on the base, whereby the substrate information contains data about at least either the obtained resistance value of the leading conductive film or the obtained resistance value of the resistance film pattern.

In this case, the polishing step can further obtain the resistance value of the resistance film pattern on the bar, whereby the ongoing-work-information further contains data about the obtained resistance value of the resistance film pattern.

In a method for manufacturing a magnetic transducer according to the second aspect of the invention, the polishing step may further obtain a dimension value of a predetermined portion of the magneto-sensitive layer on the bar, whereby the ongoing-work-information contains data about the obtained dimension value.

According to a third aspect of the invention, a method for manufacturing a magnetic transducer having a magneto-sensitive layer changing in electrical resistance in response to an external magnetic field comprises: a deposition step of selectively forming at least a magneto-sensitive layer on a predetermined substrate; a cutting step of cutting the substrate into a plurality of bars each including at least the magneto-sensitive layer; and a polishing step of polishing the bars, wherein the polishing step includes: obtaining information about the bar under working as ongoing-work-information; calculating a second value constituting a part of a potential estimated resistance value of the magneto-sensitive layer by subjecting the obtained ongoing-work-information to a predetermined operation using values previously subjected to statistical processing as weighting coefficients; and calculating the estimated resistance value by using at least the second value and controlling polishing of the bar so that the estimated resistance value reaches the target resistance value.

In the method for manufacturing a magnetic transducer, a plurality of bars each including at least the magneto-sensitive layer is cut from the substrate, and each of the bars is polished. The polishing step obtains the ongoing-work-information about the bar under working and calculates the second value by the predetermined operation using the obtained ongoing-work-information and the weighting coefficients obtained through the statistical processing. Then, the polishing step calculates the estimated resistance value by using the second value and controls polishing of the bar so that the estimated resistance value reaches the target resistance value.

In a method for manufacturing a magnetic transducer according to the third aspect of the invention, the polishing step may further obtain a dimension value of a predetermined portion of the magneto-sensitive layer on the bar under working, whereby the ongoing-work-information contains data about the obtained dimension value.

In a method for manufacturing a magnetic transducer according to the third aspect of the invention, the deposition step may further form on the substrate at least one resistance film pattern for functioning as a dummy, and the polishing step may obtain the resistance value of the resistance film pattern, whereby the ongoing-work-information further contains data about the resistance value of the resistance film pattern.

According to an aspect of the invention, an apparatus for manufacturing a magnetic transducer having a magneto-sensitive layer changing in electrical resistance in response to an external magnetic field comprises: substrate information obtaining means for obtaining information about at least either a predetermined substrate or a structure including at least a magneto-sensitive layer selectively formed on the substrate, as substrate information before polishing; polishing means for polishing a plurality of bars which the substrate is cut into, each including at least the magneto-sensitive layer; and polishing control means for controlling the polishing means based on at least the substrate information so that the magneto-sensitive layer included in the bar has a predetermined target resistance value.

According to the invention, a method for manufacturing a magnetic head comprising a magnetic transducer for reproducing information having a magneto-sensitive layer changing in electrical resistance in response to an external magnetic field comprises the steps of forming polished bars each including a plurality of magnetic transducers by a method for manufacturing a magnetic transducer according to the invention; and cutting the bar into a plurality of head sliders each including at least one magnetic transducer.

According to the invention, an apparatus for manufacturing a magnetic head comprising a magnetic transducer for reproducing information having a magneto-sensitive layer changing in electrical resistance in response to an external magnetic field comprises: an apparatus for manufacturing a magnetic transducer according to the invention; and a cutting apparatus for cutting each of polished bars formed by the apparatus for manufacturing a magnetic transducer, into a plurality of head sliders each including at least one magnetic transducer.

Software for controlling manufacturing of a magnetic transducer according to a first aspect of the present invention, which is used in manufacturing of a magnetic transducer having a magneto-sensitive layer changing in electrical resistance in response to an external magnetic field, comprises a step of obtaining information about at least either a predetermined substrate supporting magneto-sensitive layer or a structure including at least magneto-sensitive layer formed on the substrate, as substrate information before polishing, and a control step of controlling polishing of a plurality of bars which substrate is cut into, each including at least magneto-sensitive layer, wherein the control step controls polishing of bar based on at least substrate information so that magneto-sensitive layer included in the bar has a predetermined target resistance value.

Further, software for controlling manufacturing of a magnetic transducer according to a first aspect of the present invention may calculate, a first value constituting a part of a potential estimated resistance value of magneto-sensitive layer by subjecting substrate information to a predetermined operation using values previously subjected to statistical processing as weighting coefficients, and calculate estimated resistance value by using at least the first value, and control polishing of bar so that obtained estimated resistance value reaches the target resistance value.

Software for controlling manufacturing of a magnetic transducer according to a second aspect of the present invention, which obtains information about bar under polishing as information during working, in addition to substrate information, and controls polishing of bar based on both of substrate information and ongoing-work-information. In this case, software for controlling manufacturing of a magnetic transducer may calculate a first value constituting a part of a potential estimated resistance value of the magneto-sensitive layer by subjecting substrate information to a predetermined operation using values previously subjected to statistical processing as weighting coefficients, and calculate a second value constituting a part of a potential estimated resistance value by subjecting ongoing-work-information to a predetermined operation using values previously subjected to statistical processing as weighting coefficients, and calculates a potential estimated resistance value using both of a first and second value, and control polishing bars so that the estimated resistance value reaches the target resistance value.

Software for controlling manufacturing of a magnetic transducer according to a third aspect of the present invention, which is used in manufacturing of a magnetic transducer having a magneto-sensitive layer changing in electrical resistance in response to an external magnetic field, comprises a control step of controlling polishing of a plurality of bars which a predetermined substrate supporting a magneto-sensitive layer is cut into, each including at least a magneto-sensitive layer, and a step of obtaining information about a bar under polishing as ongoing-work-information, and a step of calculating a second value constituting a part of a potential estimated resistance value of a magneto-sensitive layer by subjecting a obtained ongoing-work-information to a predetermined operation using values previously subjected to statistical processing as weighting coefficients, wherein a control step calculates an estimated resistance value by using at least the second value and controls polishing of a bar so that an estimated resistance value reaches a target resistance value.

Software for estimating a resistance value of a magnetic transducer according to a first aspect of the present invention, which is for estimating an electrical resistance value of a magneto-sensitive layer in a step of manufacturing a magnetic transducer having a magneto-sensitive layer changing in electrical resistance in response to an external magnetic field, comprises a step of obtaining information about at least either a predetermined substrate supporting the magneto-sensitive layer or a structure including at least the magneto-sensitive layer formed on the substrate, as substrate information before polishing, and a step of calculating a first value constituting a part of a potential estimated resistance value of the magneto-sensitive layer by subjecting the obtained substrate information to a predetermined operation using values previously subjected to statistical processing as weighting coefficients, and an estimating step of calculating the estimated resistance value by using at least the first value.

Software for estimating a resistance value of a magnetic transducer according to a second aspect of the present invention, comprises a step of calculating the first value, and a step of obtaining information about a bar under polishing as ongoing-work-information, and a step of calculating a second value constituting a part of the estimated resistance value by subjecting the obtained ongoing-work-information to a predetermined operation using values previously subjected to statistical processing as weighting coefficients, wherein the estimating step calculates the estimated resistance value by using both of the first value and the second value.

Software for estimating a resistance value of a magnetic transducer according to a third aspect of the present invention which is for estimating an electrical resistance value of a magneto-sensitive layer in a step of manufacturing a magnetic transducer having a magneto-sensitive layer changing in electrical resistance in response to an external magnetic field, comprises a step of obtaining information about the bar as information during working, during polishing a plurality of bars which a predetermined substrate supporting the magneto-sensitive layer is cut into, each including at least the magneto-sensitive layer, and a step of calculating a second value constituting a part of a potential estimated resistance value of the magneto-sensitive layer by subjecting the obtained information during working to a predetermined operation using values previously subjected to statistical processing as weighting coefficients, and a step of calculating the estimated resistance value by using at least the second value.

A system for controlling manufacturing of a magnetic transducer according to a first aspect of the present invention, which is used in manufacturing of a magnetic transducer having a magneto-sensitive layer changing in electrical resistance in response to an external magnetic field, comprises means for obtaining information about at least either a predetermined substrate supporting a magneto-sensitive layer or a structure including at least a magneto-sensitive layer formed on a substrate, as substrate information before polishing; and control means for controlling polishing of a plurality of bars which a substrate is cut into, each including at least a magneto-sensitive layer, wherein the control means controls polishing of a bar based on at least the substrate information so that a magneto-sensitive layer included in the bar has a predetermined target resistance value.

A system for controlling manufacturing of a magnetic transducer according to a second aspect of the present invention, which obtains information about bar under polishing as ongoing-work-information, and controls polishing of the bar based on both of a substrate information and the ongoing-work-information.

A system for controlling manufacturing of a magnetic transducer according to a third aspect of the present invention, which is used in manufacturing of a magnetic transducer having a magneto-sensitive layer changing in electrical resistance in response to an external magnetic field, comprises control means for controlling polishing of a plurality of bars which a predetermined substrate supporting the magneto-sensitive layer is cut into, each including at least a magneto-sensitive layer, and means for obtaining information about the bar under polishing as ongoing-work-information, and means for calculating a second value constituting a part of a potential estimated resistance value of a magneto-sensitive layer by subjecting an obtained information during working to a predetermined operation using values previously subjected to statistical processing as weighting coefficients, wherein control means calculates an estimated resistance value by using at least the second value and controls polishing of a bar so that an estimated resistance value reaches a target resistance value.

A computer system according to a first aspect of the present invention, which is used in manufacturing of a magnetic transducer having a magneto-sensitive layer changing in electrical resistance in response to an external magnetic field, comprises means for obtaining information about at least either a predetermined substrate supporting a magneto-sensitive layer or a structure including at least a magneto-sensitive layer formed on a substrate, as substrate information before polishing, and control means for controlling polishing of a plurality of bars which the substrate is cut into, each including at least the magneto-sensitive layer, wherein a control means controls polishing of a bar based on at least a substrate information so that a magneto-sensitive layer included in the bar has a predetermined target resistance value.

A computer system according to a second aspect of the present invention, which obtains information about a bar under polishing as ongoing-work-information in addition to substrate information and controls polishing of a bar based on both of a substrate information and an ongoing-work-information.

A computer system according to a third aspect of the present invention, which is used in manufacturing of a magnetic transducer having a magneto-sensitive layer changing in electrical resistance in response to an external magnetic field, comprises control means for controlling polishing of a plurality of bars which a predetermined substrate supporting the magneto-sensitive layer is cut into, each including at least the magneto-sensitive layer, and means for obtaining information about the bar under polishing as ongoing-work-information, and means for calculating a second value constituting a part of a potential estimated resistance value of the magneto-sensitive layer by subjecting the obtained ongoing-work-information to a predetermined operation using values previously subjected to statistical processing as weighting coefficients, and calculates an estimated resistance value by using at least the second value and controls polishing of the bar so that the estimated resistance value reaches a target resistance value.

A computer system according to a fourth aspect of the present invention, which is for estimating an electrical resistance value of a magneto-sensitive layer in a step of manufacturing a magnetic transducer having a magneto-sensitive layer changing in electrical resistance in response to an external magnetic field, comprises means for obtaining information about at least either a predetermined substrate supporting the magneto-sensitive layer or a structure including at least a magneto-sensitive layer formed on a substrate, as substrate information before polishing, and means for calculating a first value constituting a part of a potential estimated resistance value of the magneto-sensitive layer by subjecting the obtained substrate information to a predetermined operation using values previously subjected to statistical processing as weighting coefficients, and estimating means for calculating an estimated resistance value by using at least a first value.

A computer system according to a fifth aspect of the present invention obtains information about a bar under polishing as ongoing-work-information, and means for calculating a second value constituting a part of an estimated resistance value by subjecting an obtained ongoing-work-information to a predetermined operation using values previously subjected to statistical processing as weighting coefficients, wherein the estimating means calculates the estimated resistance value by using both of the first value and the second value.

A computer system according to a sixth aspect of the present invention, which is used for estimating an electrical resistance value of a magneto-sensitive layer in a step of manufacturing a magnetic transducer having a magneto-sensitive layer changing in electrical resistance in response to an external magnetic field, comprises means for obtaining information about a bar as ongoing-work-information, during polishing a plurality of bars which a predetermined substrate supporting a magneto-sensitive layer is cut into, each including at least the magneto-sensitive layer, and means for calculating a second value constituting a part of a potential estimated resistance value of a magneto-sensitive layer by subjecting an obtained ongoing-work-information to a predetermined operation using values previously subjected to statistical processing as weighting coefficients, and means for calculating an estimated resistance value by using at least the second value.

Other and further objects, features and advantages of the invention will appear more fully from the following description.

BRIEF DESCRIPTION OF THE DRAWINGS

FIGS. 3A to 3D are schematic illustrations of steps of a method of manufacturing a magnetic head according to an embodiment of the invention;

FIGS. 4A to 4C are illustrations of steps following the step of FIG. 3D;

FIG. 8 is a table of types of substrate information for use in calculation of an S value and ongoing-work-information for use in calculation of a K value;

FIG. 9 is a table of an example of coefficient values of weighting coefficient names corresponding to individual pieces of substrate information and ongoing-work-information;

DETAILED DESCRIPTION OF THE PREFERRED EMBODIMENTS

Embodiments of the invention will be described in detail below with reference to the drawings.

[Example of Structure of Thin Film Magnetic Head]

Prior to the description of a method of manufacturing a magnetic head according to an embodiment of the invention, a structure of a thin film magnetic head to be manufactured by the method will be first described.

Figures 10A, 10B:
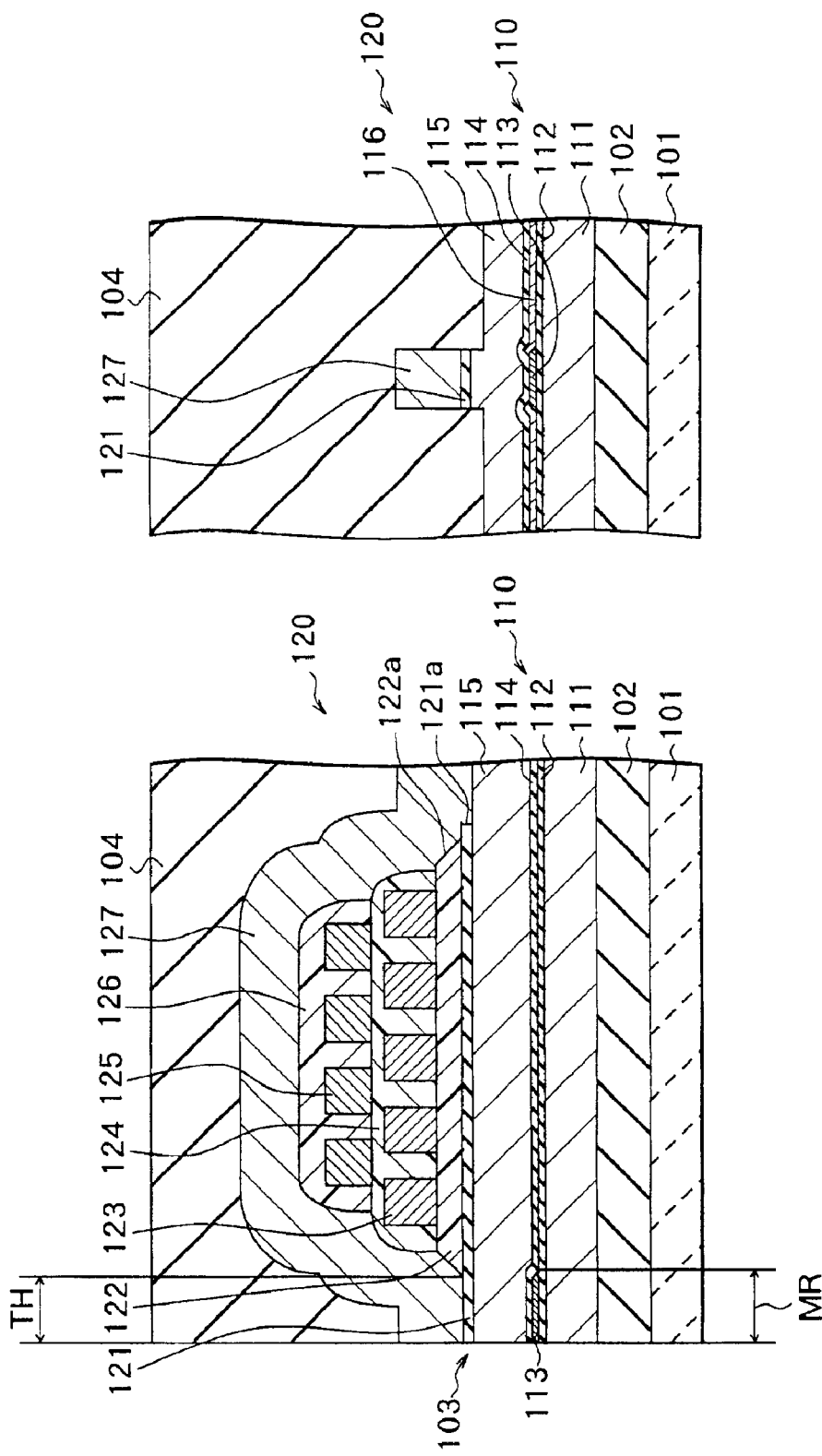
FIGS. 10A and 10B are cross sectional views of a structure of a magnetic head to be manufactured.
Figure 11:
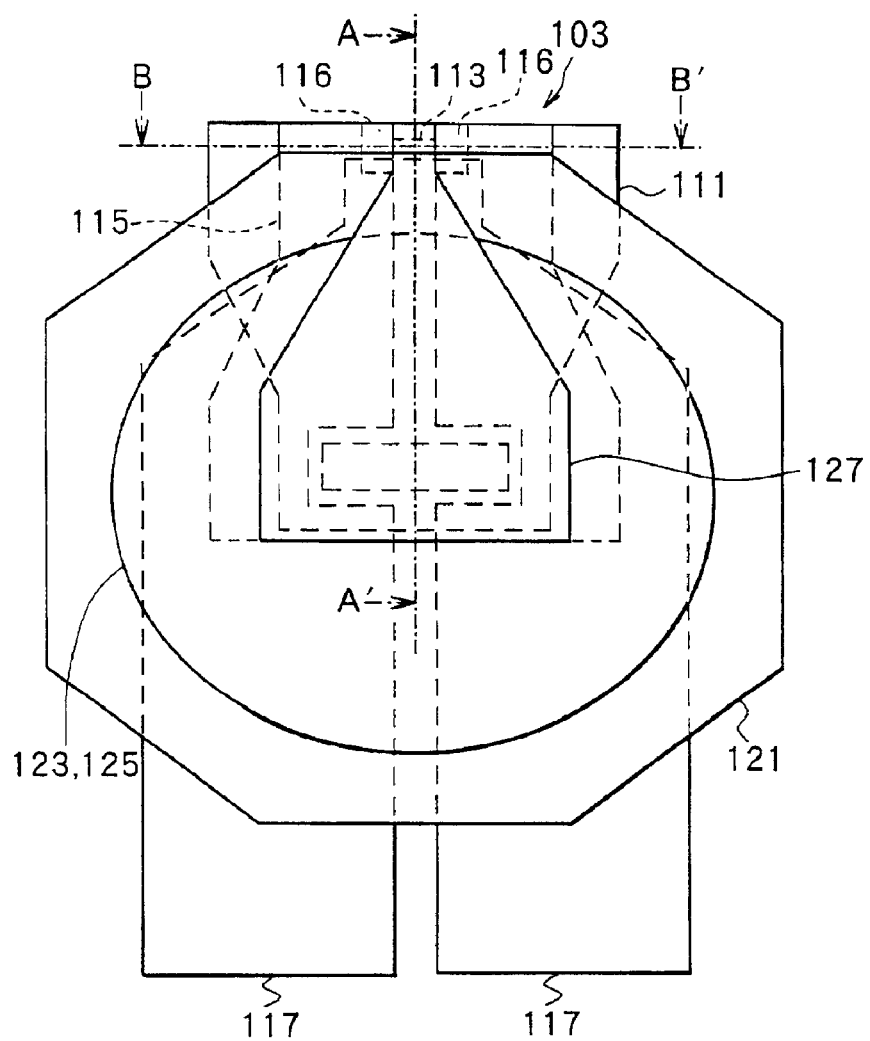
FIG. 11 is a plan view of the structure of the magnetic head to be manufactured.

FIGS. 10A and 10B show a sectional structure of the thin film magnetic head. FIG. 11 shows a planar structure of the thin film magnetic head shown in FIGS. 10A and 10B. FIG. 10A shows a cross section taken on the line A–A' of FIG. 11 perpendicular to an air bearing surface (not shown). FIG. 10B shows a cross section of a magnetic pole portion taken on the line B–B' of FIG. 11 parallel to the air bearing surface.

The thin film magnetic head is a composite thin film magnetic head having a stacked structure comprising a reproducing head 110 for reading and a recording head 120 for writing on one surface (a top surface in FIGS. 10A and 10B) of a substrate 101 as a wafer (a base) with an insulating film 102 in between. The reproducing head 110 has an MR element. The recording head 120 has an inductive magnetic transducer. The substrate 101 is made of, for example, altic, i.e., a composite material containing aluminum oxide and titanium carbide (TiC), or the like, and the thickness thereof is about 2000 µm, for example. The insulating film 102 is, for example, about 1 µm to 10 µm in thickness along a stacking direction (hereinafter referred to as a thickness) and is made of an insulating material such as aluminum oxide. The wafer of, for example, about 3 inches thick is used as the substrate 101.

The reproducing head 110 has a stacked structure comprising a first shield film 111, a first shield gap film 112, an MR film 113, a second shield gap film 114 and a second shield film 115 in order on the insulating film 102.

The first shield film 111 and the second shield film 115 are provided to magnetically shield the MR film 113. The first and second shield films 111 and 115 are located so as to face each other with the MR film 113 in between. The first shield film 111 is, for example, about 0.5 µm to 3 µm in thickness and is made of a magnetic material such as an alloy (NiFe alloy) of nickel (Ni) and iron (Fe). The second shield film 115 is, for example, about 3 µm in thickness and is made of a magnetic material such as NiFe alloy or iron nitride (FeN). The second shield film 115 also functions as a first magnetic pole of the recording head 120. The first shield gap film 112 is an insulating film for providing electrical insulation between the first shield film 111 and the MR film 113, and the second shield gap film 114 is an insulating film for providing electrical insulation between the second shield film 115 and the MR film 113.

The MR film 113 is provided to read information written on a magnetic recording medium (not shown) and is located close to an air bearing surface 103. The MR film 113 comprises, for example, an AMR film exhibiting an AMR effect, a GMR film exhibiting a GMR effect, or the like. The AMR film has a single-layered structure made of a magnetic material exhibiting an MR effect, such as NiFe (permalloy). A GMR element comprises the GMR film having the GMR effect. GMR films include, for example, a multilayered type (antiferromagnetic type) film, an inductive ferromagnetic type film, a granular type film, a TMR (tunnel effect MR) type film, a spin valve type film and the like. Of these types of films, the spin valve type GMR film is considered to have a relatively simple structure, to exhibit a great change in resistance even under a low magnetic field and to be suitable for mass production.

A length of the MR film 113 between the end thereof close to the air bearing surface 103 and the opposite end thereof is called an MR height. The MR height is one of factors that determine a reproducing output. The MR height has the following properties: the shorter MR height results in the higher reproducing output, but too short an MR height increases electrical resistance of the MR film 113 and thus reduces the reproducing output due to a rise in temperature and also the longevity of the MR film 113. Preferably, the MR height is therefore reduced to such an extent that the reproducing output and the MR film 113 are not adversely affected by the rise in temperature. The thickness of the MR film 113 is a few tens of nanometers, for example. The MR film 113 has a shorter length in the direction parallel to the air bearing surface 103 (hereinafter appropriately referred to as a track width direction) compared to the first shield film 111, the first shield gap film 112, the second shield gap film 114 and the second shield film 115.

A pair of first lead layers 116, which is located so as to face each other with the MR film 113 in between in the track width direction, is electrically connected to the MR film 113. Each of the first lead layers 116 is formed between the first shield gap film 112 and the second shield gap film 114, similarly to the MR film 113. Each first lead layer 116 is, for example, about a few tens of nanometers to a few hundreds of nanometers in thickness and has a stacked structure comprising a permanent magnet film and a conductive film. Incidentally, the permanent magnet film intrinsically functions as a film for applying a bias, but the permanent magnet film is treated as a part of the first lead layer 116 in the embodiment. The permanent magnet film is made of, for example, an alloy (CoPt alloy) of cobalt (Co) and platinum (Pt), and the conductive film is made of, for example, tantalum (Ta).

Each of second lead layers 117 is electrically connected to each of the first lead layers 116 on the side opposite to the air bearing surface 103 (see FIG. 11). Each second lead layer 117 extends from each first lead layer 116 toward the side opposite to the air bearing surface 103. Each second lead layer 117 is formed between the first shield gap film 112 and the second shield gap film 114, similarly to each first lead layer 116. Each second lead layer 117 is made of, for example, copper (Cu).

The recording head 120 has a stacked structure comprising a write gap 121, a photoresist 122, thin film coils 123, a photoresist 124, thin film coils 125, a photoresist 126 and a second magnetic pole 127 in order on the second shield film 116. The write gap 121 is, for example, about 0.1 µm to 0.3 µm in thickness and is made of an insulating material such as aluminum oxide. The write gap 121 has an opening 121a near the center of the thin film coils 123 and 125 so that the second shield film 115 and the second magnetic pole 127 are brought into contact with each other and thus they are magnetically coupled to each other.

The photoresist 122 determines a throat height TH and has a thickness of, for example, about 1.0 µm to 5.0 µm. The throat height refers to the length of the photoresist 122 between the end thereof close to the air bearing surface 103 and the air bearing surface 103 and dominates recording properties of the recording head. The photoresist 122 is spaced slightly away from the air bearing surface 103 so that the second magnetic pole 127 is in contact with the write gap 121 near the air bearing surface 103. The photoresist 122 has the same opening 122a at the position corresponding to the opening 121a of the write gap 121 so that the second shield film 115 is brought into contact with the second magnetic pole 127. Each of the thin film coils 123 and 125 is, for example, about 3 µm in thickness and is located at the position corresponding to the photoresist 122. The photoresists 124 and 126 are provided to ensure insulating properties of the thin film coils 123 and 125 and are formed at the positions corresponding to the thin film coils 123 and 126, respectively.

The second magnetic pole 127 is, for example, about 3 μm in thickness and is made of a magnetic material such as NiFe alloy or iron nitride. The second magnetic pole 127 extends from the air bearing surface 103 to near the center of the thin film coils 123 and 125 and is in contact with the write gap 121 near the air bearing surface 103. The second magnetic pole 127 is also in contact with the second shield film 115 near the center of the thin film coils 123 and 125 and is magnetically coupled to the second shield film 115.

The second magnetic pole 127 on the air bearing surface 103, the write gap 121 and a part of the second shield film 115 in contact with the write gap 121 are aligned in trim, i.e., they have the so-called trim structure. This structure is effective at preventing an increase in an effective track width resulting from a spread of magnetic flux which is generated during writing data on a narrow track.

Incidentally, an overcoat 104 is formed on the recording head 120 on the side opposite to the reproducing head 110 (the top in FIGS. 10A and 10B) so as to cover the overall surface. The overcoat 104 is, for example, 20 μm to 30 μm in thickness and is made of an insulating material such as aluminum oxide. Incidentally, the overcoat 104 is not shown in FIG. 11.

The thin film magnetic head having the above-described structure functions in the following manner. That is, the magnetic flux for writing is generated by passing a current through the thin film coils 123 and 125 of the recording head 120, whereby information is recorded on the magnetic recording medium (not shown). A signal magnetic field from the magnetic recording medium (not shown) is detected by passing a sense current through the MR film 113 of the reproducing head 110, whereby information recorded on the magnetic recording medium (not shown) is read out.

Next, an apparatus and a method for manufacturing a magnetic head according to an embodiment of the invention will be described. Since a method and an apparatus for manufacturing a magnetoresistive element, software and a system for controlling manufacturing of a magnetoresistive element, software for estimating a resistance value of a magnetoresistive element, and a computer system according to an embodiment of the invention are embodied by the method and the apparatus for manufacturing a magnetic head according to the embodiment, the former will be described below in conjunction with the latter.

[Configuration of Apparatus for Manufacturing Magnetic Head]

Figure 1:
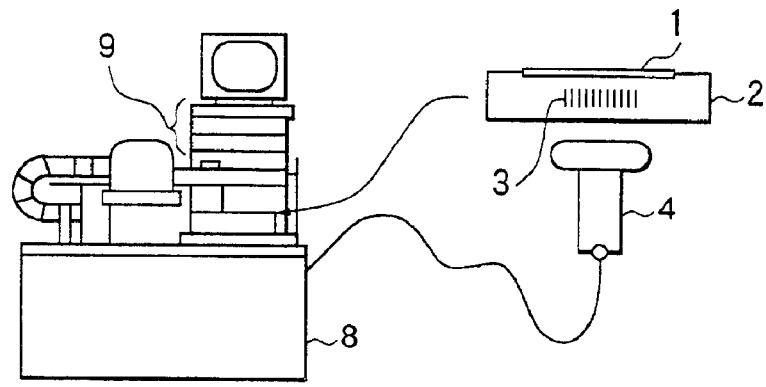
FIG. 1 is an external view of a general configuration of an apparatus for manufacturing a magnetic head according to an embodiment of the invention.
Figure 2:
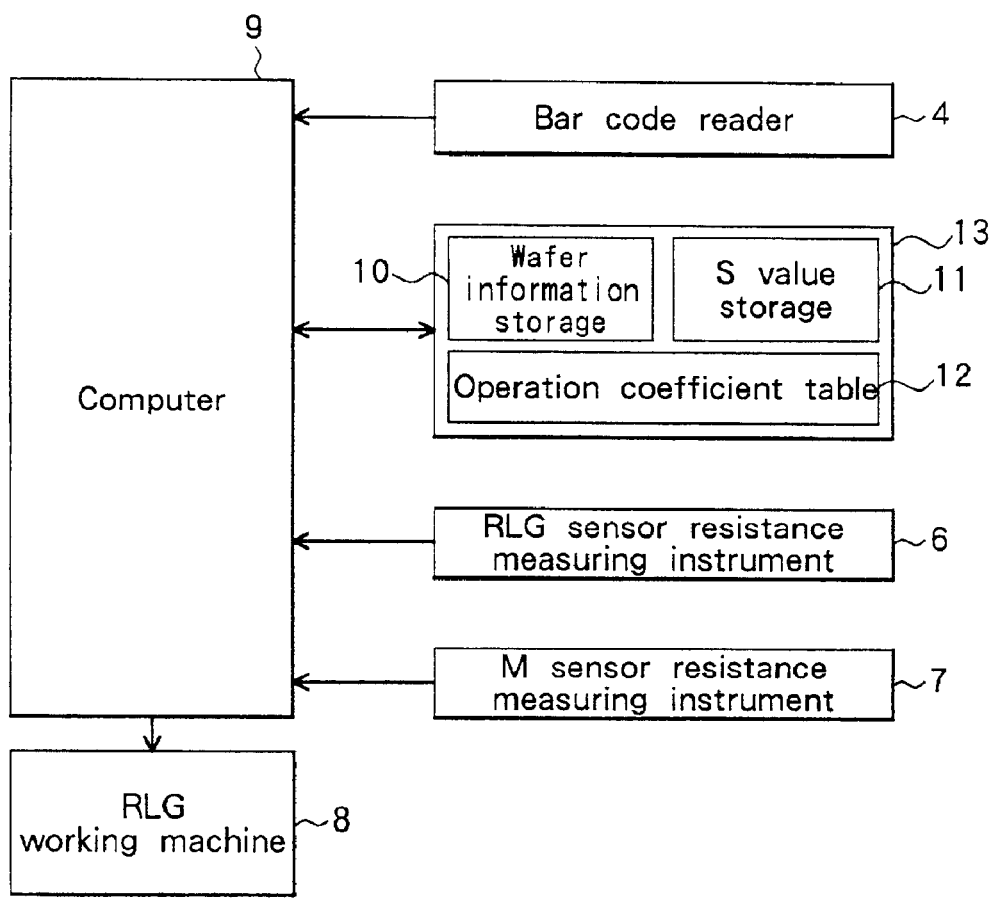
FIG. 2 is a block diagram of a general configuration of a control section of the apparatus for manufacturing a magnetic head shown in FIG. 1.

FIG. 1 shows mainly an elevational external configuration of an apparatus for manufacturing a magnetic head according to an embodiment of the invention. FIG. 2 shows a general configuration of mainly a control circuit of the apparatus for manufacturing a magnetic head shown in FIG. 1. The apparatus for manufacturing a magnetic head according to the embodiment is an apparatus for polishing a cut surface of a bar formed by cutting a wafer having a plurality of cores of a composite thin film magnetic head which has a stacked structure comprising a recording head having an inductive magnetic transducer for writing and a reproducing head having an MR element for reading.

Figure 6:
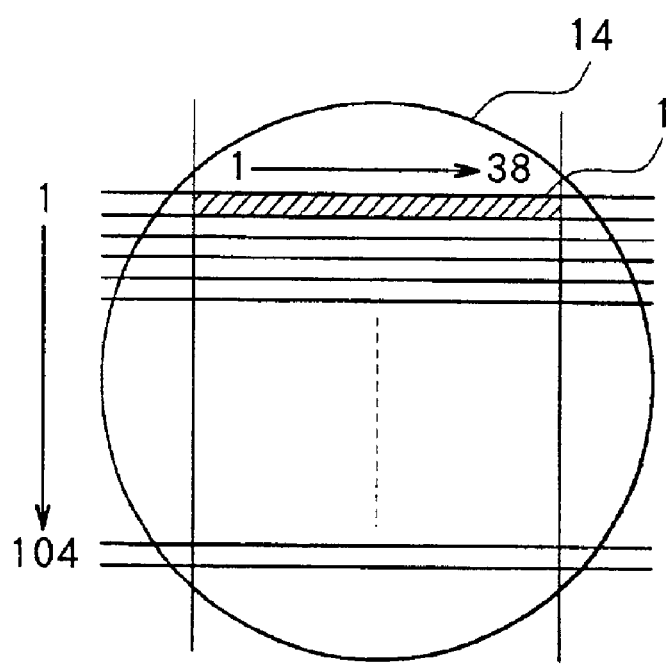
FIG. 6 is an illustration of an example of a cut pattern of a wafer.

As shown in FIGS. 1 and 2, the manufacturing apparatus comprises a jig 2 for holding each of bars 1 cut from a wafer 14 in the form of pattern shown in FIG. 6, for example; a bar code reader 4 for reading a bar code 3 on the jig 2; an RLG sensor resistance measuring instrument 6 for measuring the resistance values of RLG (Resistance Lapping Guide) sensors (not shown in FIGS. 1 and 2, see FIG. 7) included in each bar 1; an M sensor resistance measuring instrument 7 for measuring the resistance value of an M (Magnetic) sensor 59 (see FIG. 7) included in each bar 1; and an RLG working machine 8 for polishing the bars 1. In FIG. 1, the RLG sensor resistance measuring instrument 6 and the M sensor resistance measuring instrument 7 are not shown. The RLG sensor and the M sensor will be described later. The bar 1 corresponds to a specific example of "a bar piece" of the invention.

The manufacturing apparatus also comprises a computer 9 for controlling polishing of the bars 1; and a memory 13 (not shown in FIG. 1) which is referred to when the computer 9 executes a predetermined operation. The memory 13 comprises a wafer information storage 10 for storing wafer information to be described later; an S value storage 11 for storing S values to be described later; and an operation coefficient table 12 for storing predetermined operation coefficients to be described later in tabular form. A rewritable nonvolatile memory such as EEPROM (Electrically Erasable-Programmable ROM (Read Only Memory)), a rewritable volatile memory such as power-backed RAM (Random Access Memory), or the like can be used as the memory 13. However, the memory 13 is not limited to the above-mentioned memories. An external memory capable of high-speed operation, such as a hard disk drive or a magneto-optical disk drive can be also used as the memory 13.

The jig 2 is provided to hold on the top surface thereof each of the rectangular bars 1, which the wafer 14 is cut into. The jig 2 is made of, for example, a white ceramic material or the like. A bar number for identifying the bar 1 held by the jig 2 is assigned to a side surface of the jig 2 as the bar code 3 with any of shades of black. Each bar 1 cut from the wafer 14 is held by the jig 2 having the bar number corresponding to the wafer 14 and a cut position of the wafer 14. The bar code reader 4 can identify the bar 1 held by the jig 2 by reading the bar code 3 of the jig 2. The bar code 3 may be attached to, for example, a rear surface of each bar 1 opposite to the surface thereof to be polished, or the like, instead of the jig 2.

Figure 7:
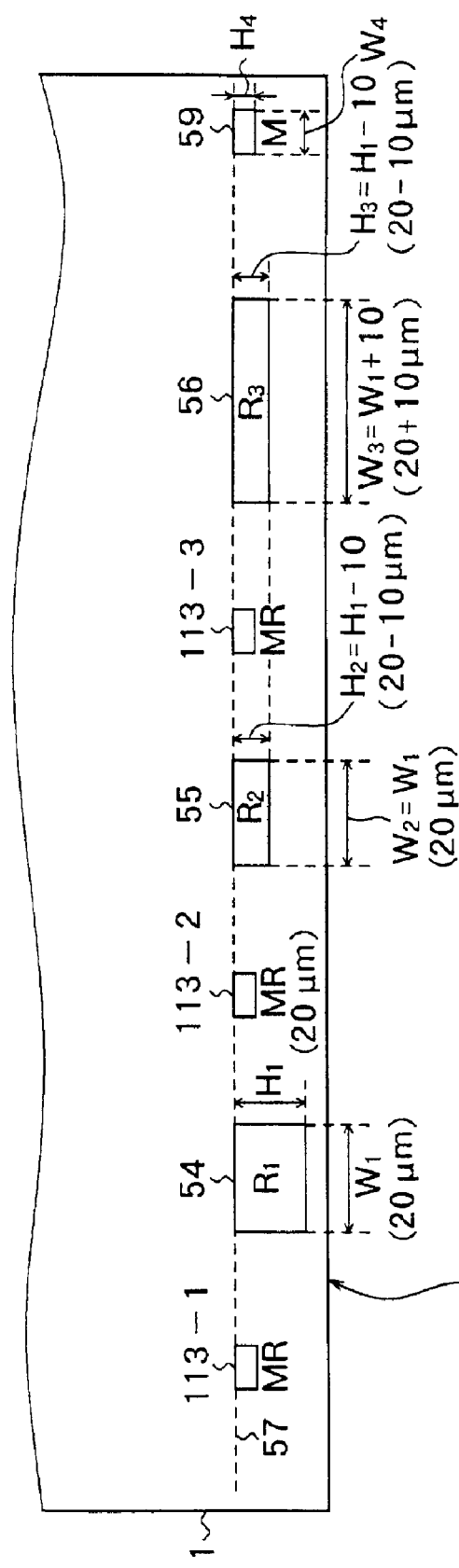
FIG. 7 is a plan view of an example of an arrangement of MR elements, RLG sensors and an M sensor in a bar.

The RLG sensor resistance measuring instrument 6 is provided to measure the resistance values of RLG sensors 54, 55, 56, ... shown in FIG. 7. The RLG sensors 54, 55, 56, ... are not structural components of the MR element but resistance film patterns serving as, so to speak, dummies, which are used as one of indicators for determining the timing of stopping polishing.

The M sensor resistance measuring instrument 7 is provided to measure the resistance value of the M sensor 59 shown in FIG. 7. The M sensor 59 is a dummy MR film having the same dimensions as the MR element to be manufactured. Similarly to the RLG sensors 54, 55, 56 and so on, the M sensor 59 is used only as one of indicators for determining the timing of stopping polishing and is not a structural component of the MR element.

The memory 13 stores wafer information, S values and predetermined operation coefficients. The wafer information contains, as well as data about the wafer 14 itself, data about the structure made on the wafer 14, such as MR film 113-1 to 113-3, the RLG sensors 54, 55 and 56, the M sensor 59 and lead conductors (the second lead layers 117). The wafer information corresponds to a specific example of "base information" of the invention. In a state in which the structure is made on the wafer 14 or a state before starting polishing after cutting the wafer 14 into the bars 1, the data is to be obtained by measurement or the like and to be stored in the wafer information storage 10. The operation coefficient table 12 is a table which is previously created by using multiple regression analysis that is one of statistical schemes. The operation coefficient table 12 includes coefficients for use in weighting for calculating the S values and coefficients for use in weighting for calculating K values to be described later. The S value is data obtained by an operation based on the wafer information and the coefficients in the operation coefficient table 12. The S value is estimated data on portions associated with a state before polishing, of factors which have an influence on a final MR resistance value obtained through polishing. The S value corresponds to a specific example of "a first value" of the invention.

The computer 9 comprises CPU (Central Processing Unit) playing a major part in controlling polishing to be performed by a polishing apparatus; a hard disk unit storing an operating system (OS) that is a basic program, an application program for controlling polishing, and the like; ROM storing BIOS (Basic Input/Output System) that is a program for booting a system, and the like; RAM that is a working memory; and so on, although any of these components are not shown. An information processing apparatus such as a personal computer is used as this type of computer 9. The CPU is adapted not only to control each part based on the application program for controlling polishing but also to perform various operations for polishing and thereby perform the control of an amount of polishing of the bar 1 or the like based on the result of the operations. Mainly, the application program for controlling polishing corresponds to a specific example of "software for controlling manufacturing of a magnetic transducer" or "software for estimating a resistance value of a magnetic transducer" of the invention. In the following description, processing executed by the application program for controlling polishing will be expressed by, in principle, taking the computer 9 as the subject (the subject word).

The computer 9 performs processing of reading out the S value from the memory 13. The computer 9 is also adapted to calculate the K value by performing predetermined weighting to be described later using the coefficients in the operation coefficient table 12 and various types of data measured at predetermined intervals during polishing by the RLG sensor resistance measuring instrument 6 and the M sensor resistance measuring instrument 7. The K value is an estimate on portions associated with a state during polishing, of factors which have an influence on the final MR resistance value obtained through polishing. The K value corresponds to a specific example of "a second value" of the invention. The computer 9 is also adapted to calculate, from the S value and the K value, an average estimate (hereinafter referred to as an MR estimate) of the MR resistance values of the bar 1 at every time of measurement, thereby performing the control so as to stop polishing at the time when the MR estimate reaches a predetermined value. Details of a method of calculating the MR estimate will be described later. The MR estimate corresponds to a specific example of "an estimated resistance value" of the invention.

The RLG working machine 8 is provided to polish the bars 1. The RLG working machine 8 is configured so that the start and stop of polishing of the bar 1 are controlled by the computer 9.

[Method of Manufacturing Magnetic Head]

Figure 5:
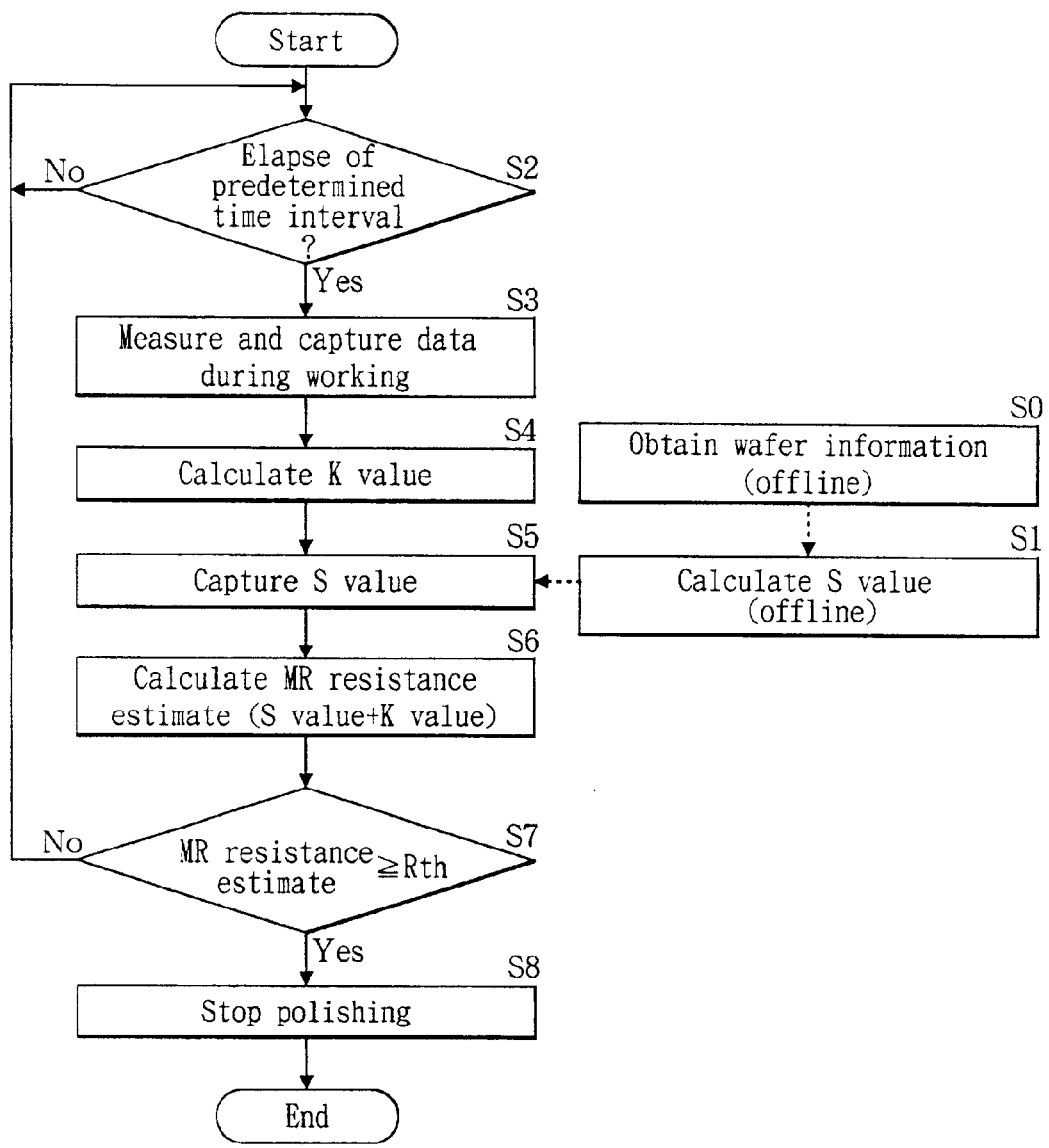
FIG. 5 is a flowchart of control operation of a computer shown in FIGS. 1 and 2.

Next, a method of manufacturing a magnetic head using the manufacturing apparatus having the above-described configuration will be described with reference to FIGS. 3A to 3D through FIG. 5. FIGS. 3A to 3D and FIGS. 4A to 4C show a general manufacturing process in the simplified form. FIG. 5 shows mainly the contents of processing by the computer 9, more specifically, the procedure for executing the above-mentioned application program for controlling polishing.

In the method of manufacturing a magnetic head according to the embodiment, first, as shown in FIG. 3A, a plurality of head cores, each of which has a stacked structure comprising a reproducing head for reading having an MR element and a magnetic induction type recording head for writing, a plurality of conductive film patterns serving as the RLG sensors, and a plurality of conductive film patterns serving as the M sensors are formed on the wafer 14 of about 3 inches thick by a thin film process. The MR element of the reproducing head refers to a unit including the MR film 113, the first lead layers 116 and the second lead layers 117. The MR film 113 corresponds to a specific example of "a magneto-sensitive layer" of the invention. The first lead layer 116 and the second lead layer 117 correspond to a specific example of "a leading conductive film" of the invention. A lead pattern comprising at least the MR film 113, the first lead layers 116 and the second lead layers 117, the conductive film patterns serving as the RLG sensors, and the conductive film patterns serving as the M sensors correspond to a specific example of "a structure formed on a wafer" of the invention.

[Thin Film Process]

The thin film process for forming the head cores and the like will be briefly described with reference to FIGS. 10A and 10B and FIG. 11.

First, the insulating film 102 made of an insulating material such as aluminum oxide is formed by sputtering or the like on the substrate 101 (the wafer 14 in FIG. 3A) made of, for example, altic, i.e., a composite material containing aluminum oxide and titanium carbide. Then, the first shield film 111 made of a magnetic material such as NiFe alloy is selectively formed on the insulating film 102 by sputtering, for example.

Then, an aluminum oxide film containing aluminum oxide is deposited on the first shield film 111 by, for example, sputtering or ion beam sputtering and then the aluminum oxide film is heated, whereby the first shield gap film 112 with high insulation is formed.

Then, after an MR effect film is formed on the first shield gap film 112 by, for example, sputtering, a photoresist pattern is selectively formed on the MR effect film. Preferably, the photoresist pattern having a shape capable of facilitating lift-off, e.g., a T-shaped cross section is formed. After that, the MR effect film is etched by, for example, ion milling using the photoresist pattern as a mask, whereby the MR film 113 having a predetermined planar shape and size is formed. In the same step as the step of forming the MR film 113, dummy resistance film patterns, which are to later function as the RLG sensors and the M sensors, are selectively formed using, for example, the same material as the material of the MR film.

Then, each of the first lead layers 116 is selectively formed on the first shield gap film 112 by, for example, sputtering using the photoresist pattern as the mask. Each first lead layer 116 is formed by, for instance, stacking the permanent magnet film made of CoPt alloy and the conductive film made of tantalum.

Then, the photoresist pattern is lifted off. After that, although not shown in FIG. 3A, each of the second lead layers 117 made of, for example, copper is selectively formed on the first shield gap film 112 by sputtering, for example.

Then, the second shield gap film 114 is formed on the first shield gap film 112, the MR film 113, each of the first lead layers 116 and each of the second lead layers 117 in the same manner as the first shield gap film 112. After that, the second shield film 115 made of a magnetic material such as NiFe alloy or iron nitride is selectively formed on the second shield gap film 114 by sputtering, for example.

After forming the second shield film 115, the write gap 121 made of an insulating material such as aluminum oxide is formed on the second shield film 115 by sputtering, for example. After that, the photoresist 122 is selectively formed on the write gap 121 by using lithography. Then, the thin film coils 123 are selectively formed on the photoresist 122 by, for example, plating or sputtering. Then, the photoresist 124 is selectively formed on the photoresist 122 and the thin film coils 123 in the same manner as the photoresist 122. Then, the thin film coils 125 are selectively formed on the photoresist 124 in the same manner as the thin film coils 123. Additionally, the photoresist 126 is selectively formed on the photoresist 124 and the thin film coils 125 in the same manner as the photoresist 122.

After forming the photoresist 126, the write gap 121 is partially etched, whereby the opening 121a is formed near the center of the thin film coils 123 and 125. After that, the second magnetic pole 127 made of a magnetic material such as NiFe alloy or iron nitride is selectively formed on the write gap 121 and the photoresists 122, 124 and 126 by sputtering, for example.

Then, the write gap 121 and the second shield film 115 are partially etched by, for example, ion milling using the second magnetic pole 127 as the mask. After that, the overcoat 104 made of aluminum oxide is formed on the second magnetic pole 127 by sputtering, for example.

As described above, as shown in FIG. 3A, many thin film magnetic head cores, each of which includes the reproducing head using the MR element and the magnetic induction type recording head, many RLG sensors and many M sensors are formed on the wafer 14. An arrangement of the RLG sensors and the M sensor in the bar will be described in detail with reference to FIG. 7 to be discussed later.

In the embodiment, in the above-mentioned thin film process, various types of wafer information are previously obtained (step S0). Specifically, immediately after forming the MR film 113, the resistance film patterns to function as the RLG sensors and the M sensors and so on, a probe of a measuring apparatus (not shown) is brought into contact with the films so that the resistance value, sheet resistance and the like of each of the films are previously measured. Immediately after forming the first lead layers 116 and the second lead layers 117, the probe of the measuring apparatus is brought into contact with the lead pattern including the first lead layers 116 and the second lead layers 117 so that the resistance value and the like of the lead pattern are previously measured. Details of the wafer information obtained by the measurement will be described later. Step S0 of obtaining the wafer information corresponds to a specific example of "a step of obtaining substrate information" of the invention.

The arrangement of the MR film 113, the RLG sensors and the M sensor on the wafer 14 will be described.

FIG. 7 shows a planar arrangement pattern of the MR film 113, the RLG sensors and the M sensor in a single bar 1 cut from the wafer 14 and the respective planar shapes thereof.

Before cutting the bar 1 from the wafer 14, the wafer 14 includes a plurality of sets of arrangement patterns shown in FIG. 7. In FIG. 7, only the MR film 113 of the head core is shown, while the first lead layers 116, the second lead layers 117 and the other films are not shown.

As shown in FIG. 7, a plurality of MR films 113-1, 113-2, 113-3, ... are arranged on a single bar 1 along a longitudinal direction of the bar 1. The first RLG sensor 54 is located between the MR films 113-1 and 113-2, the second RLG sensor 55 is located between the MR films 113-2 and 113-3, and the third RLG sensor 56, the M sensor 59 and the like are located between the MR film 113-3 and the neighboring MR film.

The patterns of the RLG sensors 54, 55 and 56 and the M sensor 59 have different dimensions. A plurality of sets of these sensors is formed on a single bar 1. The respective edges of the MR films 113-1, 113-2, 113-3, ... and the RLG sensors 54, 55 and 56, opposite to a cut surface 1a are adapted to match a virtual line 57 parallel to the cut surface 1a. The cut surface 1a is a surface which is to be finally the air bearing surface by being polished by the RLG working machine 8.

In the embodiment, the first RLG sensor 54 has a width W1 of 20 $\mu$m and a height H1 of 20 $\mu$m. The second RLG sensor 55 has a width W2 of 20 $\mu$m and a height H2 of 10 $\mu$m. The third RLG sensor 56 has a width W3 of 30 $\mu$m and a height H3 of 10 $\mu$m. The M sensor 59 has a width W4 of 1.0 $\mu$m and a height H4 of 5.5 $\mu$m.

The computer 9 writes measured values, which have been obtained by measuring the wafer 14 before being cut, into the memory 13 as wafer information before polishing. More specifically, first, in a state in which the MR elements 113-1 to 113-3, the RLG sensors 54, 55 and 56, the lead pattern (the first lead layers 116 and the second lead layers 117) and the like are made on the wafer 14, the probe of the measuring apparatus (not shown) is brought into contact with each appropriate portion of the wafer 14 so that various types of wafer information shown in FIG. 8 are measured. Then, the computer 9 causes the memory 13 to store the obtained wafer information.

The computer 9 also calculates an S value from the following equation (1) using the wafer information:

$$S \text{ value} = C0 + \Sigma(Ci \times Si) \tag{1}$$

where i=1 to 17, Si denotes wafer information in a variable list shown in FIG. 8 to be discussed later, and Ci denotes weighting coefficients in a coefficient list shown in FIG. 9 to be discussed later. FIG. 8 shows the types of wafer information measured in the thin film process of the wafer (or before starting polishing) and the types of ongoing-work-information measured in a working step to be described later, in conjunction with variable names. FIG. 9 shows an example of coefficient values, which are previously obtained by a statistical scheme based on empirical facts, corresponding to variables (various types of wafer information and information during working). For example, multiple regression analysis can be used as the statistical scheme. In FIG. 9, a variance ratio for each variable is also shown.

Each of the wafer information shown in FIG. 8 will be described in detail. Only the wafer information will be described, and the information during working will be described later.

[1] Bar number (ROWNO):
a unique number of the bar 1 cut from the wafer 14, which contains a identification number capable of identifying the wafer 14 which the bar 1 is cut from, and an identification number capable of identifying the position of the bar 1 in the wafer 14.

[2] Average of M sensor resistance during integration in bar (IMAVG):

the average of resistance values of the M sensor in a single bar, which are measured during integration (during the thin film process).

[3] Range of M sensor resistance during integration in bar (IMRNG):

the range of distribution (a difference between a maximum value and a minimum value) of resistance values of the M sensor in a single bar, which are measured during integration (during the thin film process).

[4] Average of RLG sensor (R1) resistance during integration in bar (R1AVG):

the average of resistance values of the RLG sensor 54 (R1) in a single bar, which are measured during integration (during the thin film process).

[5] Standard deviation of RLG sensor (R1) resistance during integration in bar (R1STD):

the value of the standard deviation of resistance values of the RLG sensor 54 (R1) in a single bar, which are measured during integration (during the thin film process).

[6] Average of RLG sensor (R2) resistance during integration in bar (R2AVG):

the average of resistance values of the RLG sensor 55 (R2) in a single bar, which are measured during integration (during the thin film process).

[7] Standard deviation of RLG sensor (R2) resistance during integration in bar (R2STD):

the value of the standard deviation of resistance values of the RLG sensor 55 (R2) in a single bar, which are measured during integration (during the thin film process).

[8] Average of RLG sensor (R3) resistance during integration in bar (R3AVG):

the average of resistance values of the RLG sensor 56 (R3) in a single bar, which are measured during integration (during the thin film process).

[9] Standard deviation of RLG sensor (R3) resistance during integration in bar (R3STD):

the value of the standard deviation of resistance values of the RLG sensor 56 (R3) in a single bar, which are measured during integration (during the thin film process).

[10] Average of MR film resistance during integration in bar (IMRRAVG):

the average of resistance values of the MR film 113 in a single bar, which are measured during integration (during the thin film process).

[11] Standard deviation of MR film resistance during integration in bar (IMRRSTD):

the standard deviation of resistance values of the MR film 113 in a single bar, which are measured during integration (during the thin film process).

[12] Average of lead resistance during integration in bar (LDRAVG):

the average of resistance values of the lead pattern in a single bar, which are measured during integration (during the thin film process).

[13] Standard deviation of lead resistance during integration in bar (LDRSTD):

the standard deviation of resistance values of the lead pattern in a single bar, which are measured during integration (during the thin film process).

[14] Average of sheet resistance during integration in bar (SheetRAVG):

the average of sheet resistance of the MR film 113 in a single bar, which are measured during integration (during the thin film process).

[15] Standard deviation of sheet resistance during integration in bar (SheetRSTD):

the standard deviation of sheet resistance of the MR film 113 in a single bar, which are measured during integration (during the thin film process).

[16] Average of virtual resistance during integration in bar (SVRAVG):

the average of virtual resistance of the MR film 113 in a single bar, which are calculated during integration (during the thin film process).

[17] Standard deviation of virtual resistance during integration in bar (SVRSTD):

the standard deviation of virtual resistance of the MR film 113 in a single bar, which are calculated during integration (during the thin film process).

A method of calculating lead resistance RL of a single MR element during integration and virtual resistance RSV (=C+RSH×W1) of a single MR element during integration will be described. C is called crowding resistance and represents the degree of difficulty of the passage of current resulting from the concentration of current on the connection between the MR film 113 and the first lead layer 116 (i.e., a type of contact resistance). RSH represents sheet resistance and is given by resistivity ρ/film thickness t.

The method of calculating the lead resistance RL during integration and the virtual resistance RSV during integration is as follows. That is, provided that the resistance values of the RLG sensors 54, 55 and 56 are indicated by R1, R2 and R3, respectively, that the resistance value of the lead pattern (the first lead layers 116 and the second lead layers 117) is indicated by RL and that the sheet resistance of the MR film 113 is indicated by RSH, the following equations (2) to (4) hold as are apparent from FIG. 7.

$$R1=RL+(C/H1)+(RSH \times W1)/H1 \quad (2)$$

$$R2=RL+(C/H2)+(RSH \times W2)/H2 \quad (3)$$

$$R3=RL+(C/H3)+(RSH \times W3)/H3 \quad (4)$$

As shown in FIG. 7, H2=H3=H1−a, W2=W1 and W3=W1+a are substituted into equations (2) to (4), whereby the following equations (2a) to (4a) are obtained. It should be noted that a denotes a smaller constant than H1 and, for example, a=10.

$$R1=RL+(C/H1)+(RSH \times W1)/H1 \quad (2a)$$

$$R2=RL+C/(H1-a)+(RSH \times W1)/(H1-a) \quad (3a)$$

$$R3=RL+C/(H1-a)+RSH \times (W1+a)/(H1-a) \quad (4a)$$

Therefore, the lead resistance RL during integration and the virtual resistance RSV (=C+RSH×W1) during integration expressed by the following equations (5) and (6), respectively, are obtained by solving the above simultaneous equations with three unknowns.

$$RL=R1+(H1-a) \times (R1-R2)/a \quad (5)$$

$$RSV=-H1 \times (H1-a) \times (R1-R2)a \quad (6)$$

A set of RL and RSV is obtained for each set of RLG sensors 54, 55 and 56.

Variables Si shown in FIG. 8 and coefficients Ci shown in FIG. 9 are substituted into the above equation (1), whereby the following equation (1') is obtained.

$$S \text{ value}=-23.036+(-0.005*ROWNO)+(-2.155*IMAVG)+ \\ (1.764*IMRNG)+(6.029*R1AVG)+(-2.435*R1STD)+ \\ (-5.134*R2AVG)+(1.077*R2STD)+(7.116*IMRRAVG)+ \\ (0.617*SheetRAVG)+(-0.281*SheetRSTD) \quad (1a)$$

After all, in the embodiment, the computer 9 obtains the S value by using equation (1a) and causes the S value to be stored in the S value storage 11 of the memory 13 (step S1 in FIG. 5).

The S value may be previously calculated by using any computer independently of polishing (i.e., in offline state), as well as by using the computer 9 for use in polishing as described above. In either case, the S value has only to be calculated before starting polishing.

Returning to FIGS. 3B to 3D, the description will be given.

As shown in FIG. 3B, the wafer 14 is cut into many rectangular bars 1 having predetermined dimensions. Each bar 1 is adapted to include the arrangement of a plurality (a plurality of sets) of MR films, RLG sensors and the like. The wafer 14 is cut by a dividing pattern shown in FIG. 6, for example. In an example shown in FIG. 6, 104 bars 1 are cut from a substantially available region of the wafer 14. A single bar 1 includes, for example, 38 head cores each having the MR film 113, 24 dummy RLG sensors, and 5 dummy M sensors.

Then, as shown in FIG. 3C, the bar 1 is fixedly bonded to the jig 2 with the cut surface thereof (the surface to be the air bearing surface) upward. Used is the jig 2 which has the bar code 3 corresponding to the bar number indicating the wafer 14 which the bar 1 is cut from and the position occupied by the bar 1 in the wafer 14.

Then, as shown in FIG. 3D, the bar code 3 attached to the jig 2 is read by the bar code reader 4, whereby the number of the bar 1 is identified.

Then, as shown in FIG. 4A, the jig 2 holding the bar 1 is set on the RLG working machine 8 so that the RLG working machine 8 starts polishing the cut surface of the bar 1.

As shown in FIG. 4B, in a step of polishing the bar 1, the computer 9 measures the resistance values of the RLG sensors 54, 55 and 56 and the resistance value of the M sensor 59 after every elapse of a predetermined time interval (e.g., 5 sec to 10 sec) (YES in step S2 in FIG. 6) (step S3). Specifically, the RLG sensor resistance measuring instrument 6 brings a probe 20 into contact with the RLG sensors 54, 55 and 56 and measures the resistance values thereof, while the M sensor resistance measuring instrument 7 brings a probe 21 into contact with the M sensor 59 and measures the resistance value thereof. The computer 9 also calculates an MR height HMR by using the following equation (7) using the measured resistance values of the RLG sensors 54, 55 and 56, the measured resistance RL of the lead pattern and the already-obtained virtual resistance RSV during integration as the wafer information.

$$HMR=RSV/(R1-RL)=C+RSH \times W1/(R1-RL) \qquad (7)$$

Then, the computer 9 reads out coefficients associated with measurement parameters from the operation coefficient table 12 previously created by multiple regression analysis of the measurement parameters during polishing. Furthermore, the computer 9 performs weighting by the following equation (8), that is, the computer 9 multiplies the read-out coefficients by the values of the measurement parameters and adds the results of multiplication to one another, thereby calculating a K value (step S4):

$$K \text{ value}=\Sigma(Dj \times Kj) \qquad (8)$$

where j=1 to 3, Kj denotes information during working in the variable list shown in FIG. 8, and Dj takes on values in the coefficient list shown in FIG. 9. The ongoing-work-information shown in FIG. 8 will be described.

[1] Average of MR heights during polishing in bar (FMRHAVG):
the average of a plurality of MR heights in a single bar, which are calculated by equation (7) in the polishing step.

[2] Average of RLG sensor resistance during polishing in bar (FRLGAVG):
the average of resistance values of a plurality of RLG sensors in a single bar, which are measured by the RLG sensor resistance measuring instrument 6 in the polishing step.

[3] Average of virtual resistance RSV during polishing in bar (FMAVG):
the average of a plurality of virtual resistance values RSV in a single bar, which are calculated by equation (6) in the polishing step.

Assuming that the coefficient Dj takes on values shown in FIG. 9, equation (8) is expressed as the following equation (8a). The computer 9 calculates a K value using equation (8a).

$$K \text{ value}=(5.660 \times FMRHAVG)+(0.114 \times FRLGAVG)+(0.212 \times FMAVG) \qquad (8a)$$

Then, the computer 9 captures the S value from the S value storage 11 of the memory 13 (step S5). Then, the computer 9 adds the S value to the K value calculated from equation (8a), thereby calculating an MR resistance estimate (step S6).

Furthermore, the computer 9 compares the calculated MR resistance estimate to a predetermined threshold value Rth (a target resistance value). When the MR resistance estimate is equal to or more than the threshold value Rth (YES in step S7), the computer 9 stops the RLG working machine 8 from polishing (step S8). When the MR resistance estimate is less than the threshold value Rth (NO in step S7), the computer 9 returns to step S2 and causes the RLG working machine 8 to continue polishing, thereby reducing the MR height. Steps S2 to S8 in FIG. 5 correspond to a specific example of "a control step" of the invention.

In the embodiment, the S value is captured from the memory 13 at every monitoring cycle. However, this example may be replaced by the following example. That is, the S value is captured only once at the time of starting polishing, the S value is stored in, for example, DRAM (Dynamic Random Access Memory) or the like in the computer 9, and the S value is read out at every monitoring cycle so that the S value is used to calculate the MR resistance estimate as described above.

Then, as shown in FIG. 4C, the bar 1, which has finished undergoing the polishing step, is cut into separate magnetic head sliders 15 with predetermined dimensions by a dicing step or the like.

[Distribution of Resistance Values of MR Films of Manufactured Magnetic Heads]

Figure 12A:
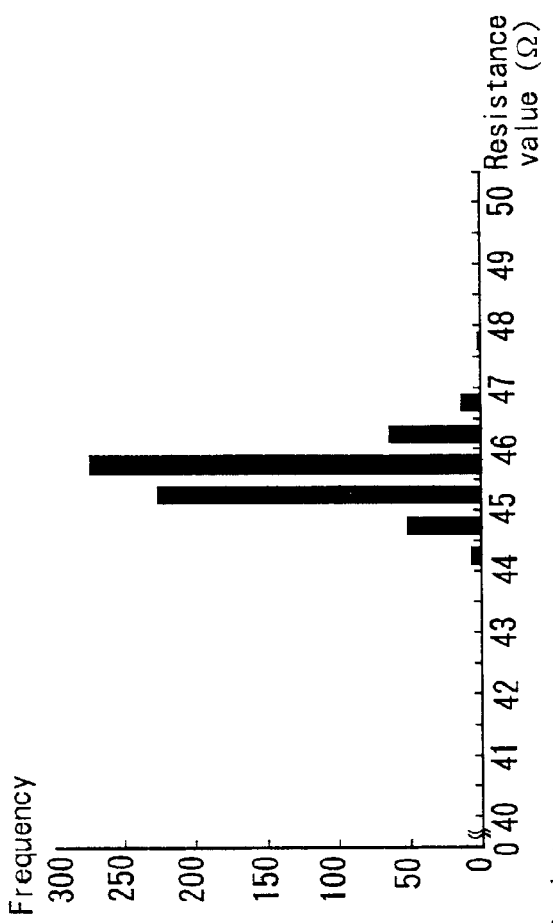
FIGS. 12A and 12B are a graph and a plot of a state of variation in resistance values of MR elements of magnetic heads manufactured by the method of manufacturing a magnetic head according to the invention, respectively.
Figure 12B:
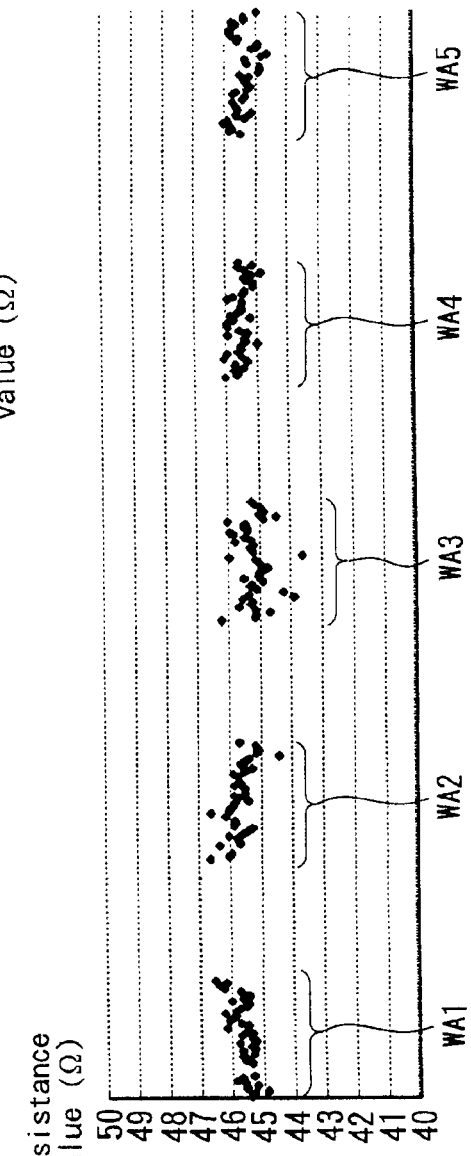
Figure 13A:
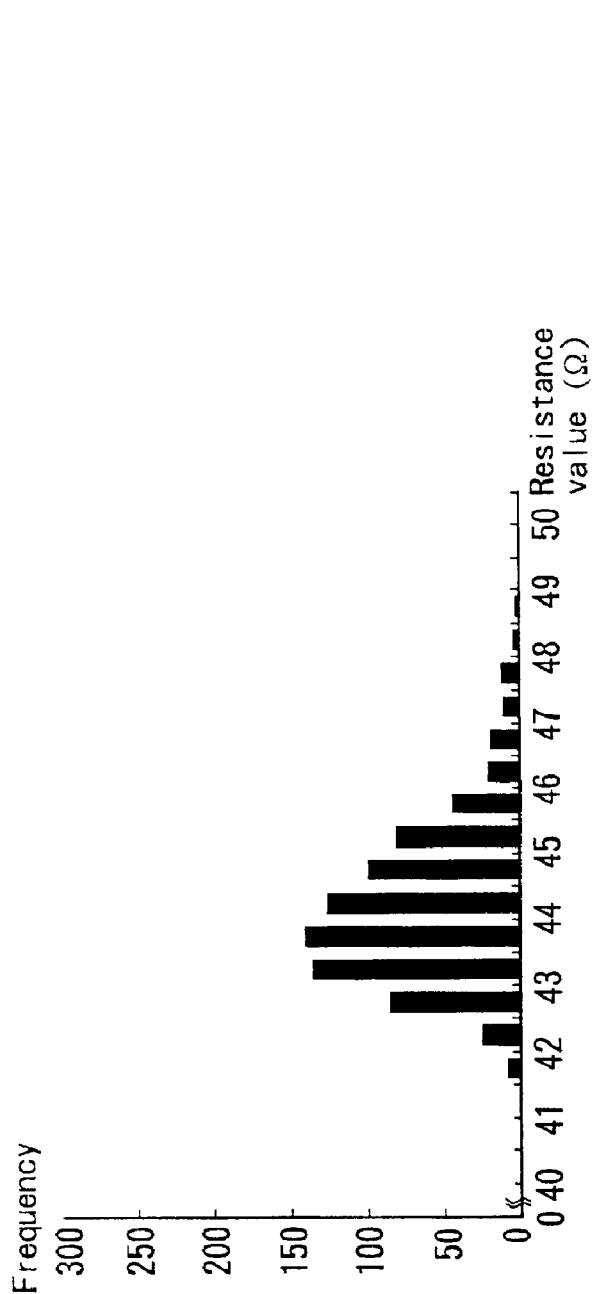
FIGS. 13A and 13B are a graph and a plot of a state of variation in MR resistance values of MR elements of magnetic heads manufactured by a method of manufacturing a magnetic head of the related art, respectively.
Figure 13B:
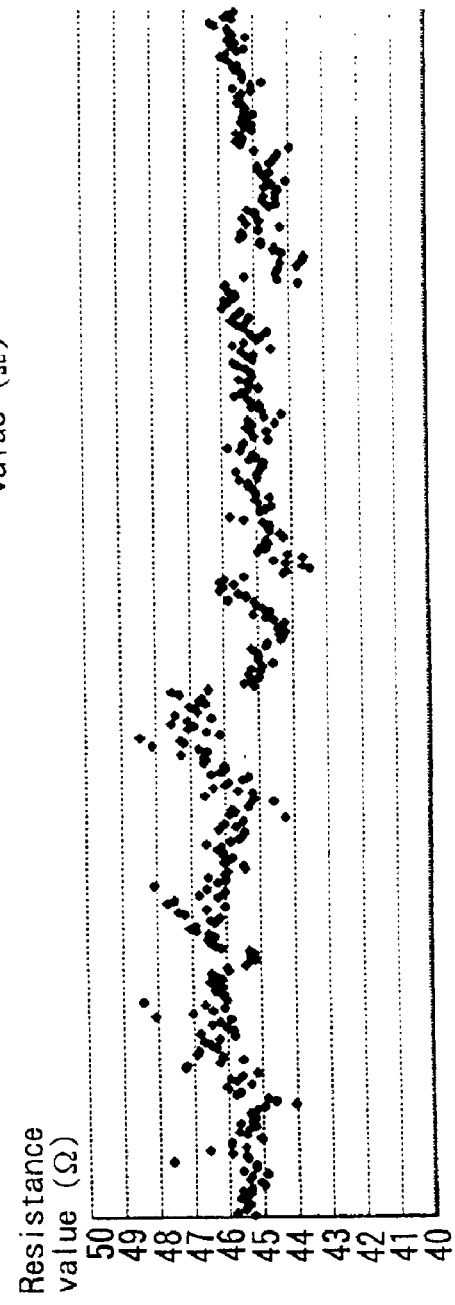

FIGS. 12A and 12B show the result of measurement of resistance values of MR elements of many magnetic heads manufactured by using a method and an apparatus for manufacturing a magnetic head according to the embodiment. FIGS. 13A and 13B show the result of measurement of resistance values of MR elements of many magnetic heads manufactured by using a method and an apparatus for manufacturing a magnetic head of the related art. FIGS. 12A and 13A are histograms of distribution of resistance values of MR films obtained. In FIGS. 12A and 13A, the axis of abscissas represents an MR resistance value, and the axis of ordinates represents frequency. FIGS. 12B and 13B show a distribution of the average of MR resistance values of MR films obtained from each bar. In FIGS. 12B and 13B, the axis of abscissas represents a change (transition) of each bar, and the axis of ordinates represents an average MR resistance value of each bar.

As is clear from FIG. 12B, according to the manufacturing method and apparatus of the embodiment, in, for example, a group WA4 of average MR resistance values of the bars obtained from a single wafer, a range of variation in the average MR resistance values of the bars is as narrow as about 1.2Ω. Even in a group WA2 or WA3 exhibiting the widest range of variation, the range of variation is about 3Ω or less. The average MR resistance value of each wafer is substantially fixed and exhibits a very narrow range of variation. Consequently, as a whole, the range of distribution is also narrow as shown in FIG. 12A In an example shown in FIG. 12A, the average of all the resistance values was 45.58Ω, and the standard deviation thereof was 0.47Ω.

On the other hand, in the related art shown in FIG. 13B, the range of variation in the average resistance values of the bars obtained from a single wafer is as wide as about 5Ω at the maximum. The average MR resistance value of each wafer exhibits a wide range of wafer-to-wafer variation. Consequently, as a whole, the range of distribution is also wide as shown in FIG. 13A. In an example shown in FIG. 13A, the average of all the resistance values was 44.2Ω, and the standard deviation thereof was 1.22Ω.

As described above, according to the method of manufacturing a magnetic head of the embodiment, various types of factors in a wafer stage which may have an influence on the resistance value of the final MR film are expressed as the S value using the statistical scheme before starting polishing, and various types of factors in a polishing stage which may have an influence on the resistance value of the final MR film are expressed as the K value using the statistical scheme at regular intervals during the polishing step. From the two values, the MR resistance estimate during the polishing step is calculated every moment so as to stop polishing when the MR resistance estimate reaches the target resistance value. As a result, the MR resistance value of the manufactured magnetic head can fall within a target range with high precision, and variation in the MR resistance value can be reduced In other words, according to the embodiment, the timing of stopping polishing is determined in consideration of also various types of data (wafer information) which are obtained at the time when the MR elements and the like are integrated on the wafer or at the time before starting polishing. Therefore, compared to the related art in which the dimensions of the elements are tracking-controlled while the MR height is only monitored, the embodiment can reduce factors of variation which have been already produced during integration of the elements on the wafer, and consequently the embodiment can make the MR resistance values of the wafers and the bars uniform. Moreover, an absolute value of each MR resistance hardly falls outside an appropriate range of numerical values. Therefore, a yield of a product can be greatly improved.

According to the embodiment, both of the S value and the K value are calculated based on the statistical scheme. Therefore, optimum control of polishing based on empirical facts can be performed. As a result, the embodiment is still more effective in making the MR resistance values uniform and making the absolute value of the MR resistance appropriate.

Although the invention has been described above by referring to some embodiments, the invention is not limited to these embodiments and various modifications of the invention are possible. For example, in the above-mentioned embodiments, the MR resistance estimate is calculated using both of the S value and the K value, but the invention is not limited to these embodiments. For instance, the MR resistance estimate may be calculated in consideration of only the S value. Alternatively, the MR resistance estimate may be calculated in consideration of the S value and a part of the K value (e.g., the MR height). Alternatively, the MR resistance estimate may be calculated in consideration of only the K value without consideration of the S value.

In the embodiment, multiple regression analysis is used as the statistical scheme for calculating the coefficients Ci and Dj in equations (1) and (8). However, a scheme other than multiple regression analysis may be used.

Figure 14:
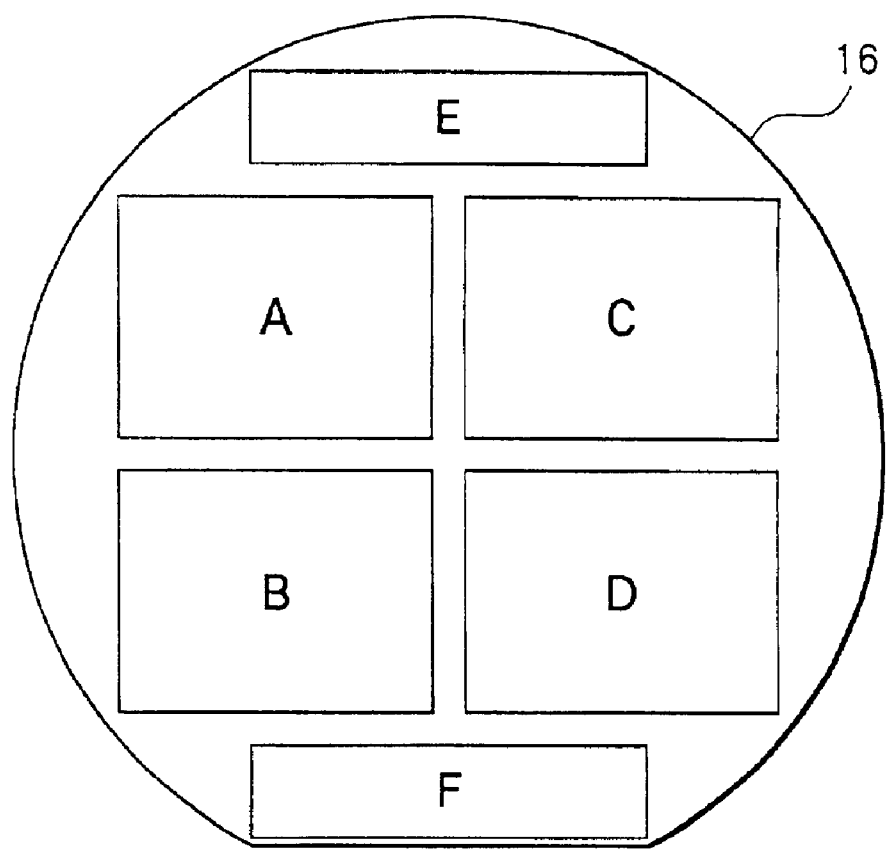
FIG. 14 is an illustration of an example of a blocking pattern for cutting a large wafer into bars.

In the above-mentioned embodiment, the description has been given with regard to an example in which the wafer of about 3 inches thick is used. However, a large wafer of 6 inches or more thick may be used. In this case, because of limits by an existing exposure system for a wafer of about 3 inches to 5 inches thick, photolithography or the like, as an example is shown in FIG. 14, a large wafer 16 can be divided into a plurality of rectangular blocks A, B, C, . . . , F so that bars are cut from each block. Preferably, position information indicating which block and which part of the block each bar cut from the large wafer 16 is cut from, information indicating a difference in exposure conditions according to positions in the same wafer, and the like are used as variables for use in equations for calculating the MR resistance estimate.

As the type of variable for use in equations for calculating the MR resistance estimate, in addition to the average and standard deviation of measured values shown in FIG. 8, statistical information such as a maximum value, a minimum value, a median value or a modal value of the measured values, or the like may be considered as another variable. When such variables are considered, the degree of contribution of the variables to the MR resistance value can be previously determined as weighting coefficients by the statistical scheme so as to perform weighting using the coefficients as well.

In the above-mentioned embodiment, the description has been given with regard to an example in which polishing is controlled for each bar. However, polishing may be controlled for each head slider obtained from a single bar. In this case, the S value and the K value can be calculated for each individual head slider.

In the embodiment, a magnetoresistive element for use in a magnetic head has been described as an example. However, the invention is also applicable to a magnetoresistive element for use in various types of detection devices such as an acceleration sensor or a geomagnetic sensor and manufacturing of such a detection device.

As described above, according to a method for manufacturing a magnetic transducer or an apparatus for manufacturing a magnetic transducer of the invention, polishing of each bar cut from the substrate is controlled based on the substrate information so that the magneto-sensitive layer included in the bar has the predetermined target resistance value. Therefore, achieved is an effect of making it possible to control polishing in consideration of facts that have already existed before starting polishing.

More particularly, according to the method for manufacturing a magnetic transducer or the apparatus for manufacturing a magnetic transducer of the invention, the first value is obtained by the predetermined operation using the substrate information and the weighting coefficients obtained through the statistical processing, and the estimated resistance value is calculated by using the first value. Polishing of the bar is controlled so that the estimated resistance value reaches the target resistance value. In addition to the above-mentioned effect, an effect of enabling control of polishing optimized based on statistical or empirical facts is therefore achieved.

More particularly, according to the method for manufacturing a magnetic transducer or the apparatus for manufacturing a magnetic transducer of the invention, the ongoing-work-information about the bar under polishing is also obtained, and polishing of the bar is controlled based on both of the information during working and the substrate information so that the magneto-sensitive layer included in the bar has the predetermined target resistance value. Therefore, achieved is an effect of making it possible to control polishing in consideration of facts appearing after starting polishing, as well as facts that have already existed before starting polishing.

According to another method for manufacturing a magnetic transducer or another apparatus for manufacturing a magnetic transducer of the invention, the polishing step includes: obtaining the ongoing-work-information about the bar under working; calculating the second value by the predetermined operation using the ongoing-work-information and the weighting coefficients obtained through the statistical processing; and calculating the estimated resistance value by using at least the second value and controlling polishing of the bar so that the estimated resistance value reaches the target resistance value. Therefore, achieved is an effect of enabling control of polishing optimized based on statistical or empirical facts after starting polishing.

According to a method for manufacturing a magnetic head or an apparatus for manufacturing a magnetic head of the invention, the magnetic head is manufactured by using the method for manufacturing a magnetic transducer or the apparatus for manufacturing a magnetic transducer of the invention. Therefore, achieved is an effect of manufacturing the magnetic head through control of polishing performed in consideration of facts that have already existed before starting polishing.

Obviously many modifications and variations of the present invention are possible in the light of the above teachings. It is therefore to be understood that within the scope of the appended claims the invention may be practiced otherwise than as specifically described.

What is claimed is:

1. A method for manufacturing a magnetic transducer having a magneto-sensitive layer changing in electrical resistance in response to an external magnetic field, comprising:
    a film forming step of selectively forming at least a magneto-sensitive layer on a predetermined substrate;
    a substrate information obtaining step of obtaining information about at least either the substrate or a structure including at least the magneto-sensitive layer formed on the substrate, as substrate information before polishing;
    a cutting step of cutting a base into a plurality of bars each bar in the plurality of bars including at least the magneto-sensitive layer; and
    a polishing step of polishing the bars,
    wherein the polishing step controls polishing of the bar based on at least the substrate information until the magneto-sensitive layer included in the bar reaches a predetermined target resistance value;
    a step of calculating a first value constituting a part of a potential estimated resistance value of the magneto-sensitive layer by subjecting the substrate information to a predetermined operation using values previously subjected to statistical processing as weighting coefficients,
    wherein the polishing step calculates the estimated resistance value by using at least the first value and controls polishing of the bar until the estimated resistance value of the magneto-sensitive layer reaches the predetermined target resistance value.

2. A method for manufacturing a magnetic transducer according to claim 1,
    wherein the substrate information obtaining step obtains at least either a resistance value or sheet resistance value of the magneto-sensitive layer made on the substrate or a virtual resistance value of the magneto-sensitive layer containing a crowding resistance component as well,
    whereby the substrate information contains data about at least either the obtained resistance value or sheet resistance value of the magneto-sensitive layer or the obtained virtual resistance value of the magneto-sensitive layer.

3. A method for manufacturing a magnetic transducer according to claim 1,
    wherein the film forming step further forms at least either a leading conductive film to be electrically connected to the magneto-sensitive layer or at least one resistance film pattern for functioning as a dummy, and
    the substrate information obtaining step obtains the resistance value of at least either the leading conductive film or the resistance film pattern made on the substrate,
    whereby the substrate information contains data about at least either the obtained resistance value of the leading conductive film or the obtained resistance value of the resistance film pattern.

4. A method for manufacturing a magnetic transducer according to claim 1,
    wherein the polishing step further obtains information about the bar under working as ongoing-work-information and controls polishing of the bar based on both of the substrate information and the information during working until a resistance of the magneto-sensitive layer included in the bar reaches a predetermined target resistance value.

5. A method for manufacturing a magnetic transducer according to claim 4, further comprising:
    a step of calculating a first value constituting a part of a potential estimated resistance value of the magneto-sensitive layer by subjecting the substrate information to a predetermined operation using values previously subjected to statistical processing as weighting coefficients,
    wherein the polishing step calculates the estimated resistance value by using both of the first value and the ongoing-work-information and controls polishing of the bar until the estimated resistance value reaches the target resistance value.

6. A method for manufacturing a magnetic transducer according to claim 5, further comprising:
    a step of calculating a second value constituting a part of the estimated resistance value by subjecting the ongoing-work-information to a predetermined operation using values previously subjected to statistical processing as weighting coefficients,
    wherein the polishing step calculates the estimated resistance value by using both of the first value and the second value and controls polishing of the bar until the estimated resistance value reaches the target resistance value.

7. A method for manufacturing a magnetic transducer according to claim 4, wherein the substrate information obtaining step obtains at least either a resistance value or sheet resistance value of the magneto-sensitive layer made on the substrate or a virtual resistance value of the magneto-sensitive layer containing a crowding resistance component as well, whereby the substrate information contains data about at least either the obtained resistance value or sheet resistance value of the magneto-sensitive layer or the obtained virtual resistance value of the magneto-sensitive layer.

8. A method for manufacturing a magnetic transducer according to claim 4, wherein the film forming step further forms at least either a leading conductive film to be electrically connected to the magneto-sensitive layer or at least one resistance film pattern for functioning as a dummy, and the substrate information obtaining step obtains the resistance value of at least either the leading conductive film or the resistance film pattern made on the base, whereby the substrate information contains data about at least either the obtained resistance value of the leading conductive film or the obtained resistance value of the resistance film pattern.

9. A method for manufacturing a magnetic transducer according to claim 8, wherein the polishing step further obtains the resistance value of the resistance film pattern on the bar, whereby the ongoing-work-information further contains data about the obtained resistance value of the resistance film pattern.

10. A method for manufacturing a magnetic transducer according to claim 4, wherein the polishing step further obtains a dimension value of a predetermined portion of the magneto-sensitive layer on the bar, whereby the ongoing-work-information contains data about the obtained dimension value.

11. A method for manufacturing a magnetic head comprising a magnetic transducer for reproducing information having a magneto-sensitive layer changing in electrical resistance in response to an external magnetic field, comprising the steps of:

forming polished bars each including a plurality of magnetic transducers by a manufacturing method according to claim 2; and cutting the bar into a plurality of head sliders each including at least one magnetic transducer.

12. A method for manufacturing a magnetic transducer having a magneto-sensitive layer changing in electrical resistance in response to an external magnetic field, comprising:

a film forming step of selectively forming at least a magneto-sensitive layer on a predetermined substrate;

a cutting step of cutting the substrate into a plurality of bars, each bar including at least the magneto-sensitive layer; and a polishing step of polishing the plurality of bars, wherein the polishing step includes obtaining information about a bar under working as ongoing-work-information;

calculating a resistance value constituting a part of a potential estimated resistance value of the magneto-sensitive layer by subjecting the obtained ongoing-work-information to a predetermined operation using values previously subjected to statistical processing as weighting coefficients; and calculating the estimated resistance value by using at least the resistance value and controlling polishing of the bar until the estimated resistance value reaches a target resistance value.

13. A method for manufacturing a magnetic transducer according to claim 12, wherein the polishing step obtains a dimension value of a predetermined portion of the magneto-sensitive layer on a bar piece under working, whereby the ongoing-work-information contains data about the obtained dimension value.

14. A method for manufacturing a magnetic transducer according to claim 12, wherein the film forming step further forms on the substrate at least one resistance film pattern for functioning as a dummy, and the polishing step obtains the resistance value of the resistance film pattern, whereby the ongoing-work-information further contains data about the resistance value of the resistance film pattern.

15. An apparatus for manufacturing a magnetic transducer having a magneto-sensitive layer changing in electrical resistance in response to an external magnetic field, comprising:

substrate information obtaining means for obtaining information about at least either a predetermined substrate or a structure including at least a magneto-sensitive layer selectively formed on the substrate, as substrate information before polishing;

polishing means for polishing each bar of a plurality of bars which the substrate is cut into, each including at least the magneto-sensitive layer; and polishing control means for controlling the polishing means based on at least the substrate information until the magneto-sensitive layer included in the bar reaches a predetermined target resistance value;

wherein the polishing control means calculates a first value constituting a part of a potential estimated resistance value of the magneto-sensitive layer by subjecting the substrate information to a predetermined operation using values previously subjected to statistical processing as weighting coefficients, calculates the estimated resistance value by using at least the first value, and controls polishing of the bar until the estimated resistance value reaches the target resistance value.

16. An apparatus for manufacturing a magnetic transducer according to claim 15, wherein the substrate information obtaining means obtains at least either a resistance value or sheet resistance value of the magneto-sensitive layer made on the substrate or a virtual resistance value of the magneto-sensitive layer containing a crowding resistance component as well, whereby the substrate information contains data about at least either the obtained resistance value or sheet resistance value of the magneto-sensitive layer or the obtained virtual resistance value of the magneto-sensitive layer.

17. An apparatus for manufacturing a magnetic transducer according to claim 15,
- wherein the substrate information obtaining means obtains the resistance value of at least either a leading conductive film formed so as to be electrically connected to the magneto-sensitive layer or a resistance film pattern formed as a dummy,
- whereby the substrate information contains data about at least either the obtained resistance value of the leading conductive film or the obtained resistance value of the resistance film pattern.

18. An apparatus for manufacturing a magnetic transducer according to claim 15, further comprising:
- ongoing-work-information obtaining means for obtaining information about the bar under working as ongoing-work-information,
- wherein the polishing control means controls polishing of the bar based on both of the substrate information and the ongoing-work-information until the magneto-sensitive layer included in the bar reaches a predetermined target resistance value.

19. An apparatus for manufacturing a magnetic transducer according to claim 18, wherein the polishing control means calculates a first value constituting a part of a potential estimated resistance value of the magneto-sensitive layer by subjecting the substrate information to a predetermined operation using values previously subjected to statistical processing as weighting coefficients, calculates the estimated resistance value by using both of the first value and the ongoing-work-information, and controls polishing of the bar until the estimated resistance value reaches the target resistance value.

20. An apparatus for manufacturing a magnetic transducer according to claim 19, wherein the polishing control means further calculates a second value constituting a part of the estimated resistance value by subjecting the ongoing-work-information to a predetermined operation using values previously subjected to statistical processing as weighting coefficients, calculates the estimated resistance value by using both of the first value and the second value, and controls polishing of the bar until the estimated resistance value of the magneto-sensitive layer reaches the target resistance value.

21. An apparatus for manufacturing a magnetic transducer according to claim 18,
- wherein the substrate information obtaining means obtains at least either a resistance value or sheet resistance value of the magneto-sensitive layer made on the substrate or a virtual resistance value of the magneto-sensitive layer containing a crowding resistance component as well,
- whereby the substrate information contains data about at least either the obtained resistance value or sheet resistance value of the magneto-sensitive layer or the obtained virtual resistance value of the magneto-sensitive layer.

22. An apparatus for manufacturing a magnetic transducer according to claim 18,
- wherein the substrate information obtaining means obtains the resistance value of at least either a leading conductive film formed so as to be electrically connected to the magneto-sensitive layer or a resistance film pattern formed as a dummy,
- whereby the substrate information contains data about at least either the obtained resistance value of the leading conductive film or the obtained resistance value of the resistance film pattern.

23. An apparatus for manufacturing a magnetic transducer according to claim 22,
- wherein the polishing control means further obtains the resistance value of the resistance film pattern on the bar,
- whereby the ongoing-work-information further contains data about the obtained resistance value of the resistance film pattern.

24. An apparatus for manufacturing a magnetic transducer according to claim 18,
- wherein the polishing control means further obtains a dimension value of a predetermined portion of the magneto-sensitive layer on the bar,
- whereby the ongoing-work-information contains data about the obtained dimension value.

25. An apparatus for manufacturing a magnetic head comprising a magnetic transducer for reproducing information having a magneto-sensitive layer changing in electrical resistance in response to an external magnetic field, comprising:
- an apparatus for manufacturing a magnetic transducer according to claim 15; and
- a cutting apparatus for cutting each of polished bars formed by the apparatus for manufacturing a magnetic transducer, into a plurality of head sliders each including at least one magnetic transducer.

26. An apparatus for manufacturing a magnetic transducer having a magneto-sensitive layer changing in electrical resistance in response to an external magnetic field, comprising:
- cutting means for cutting a substrate, on which at least a magneto-sensitive layer is selectively formed, into a plurality of bars each including at least the magneto-sensitive layer;
- polishing means for polishing the bars, and
- ongoing-work-information obtaining means for obtaining information about a bar under working as ongoing-work-information,
- polishing control means for calculating a resistance value constituting a part of a potential estimated resistance value of the magneto-sensitive layer by subjecting the obtained ongoing-work-information to a predetermined operation using values previously subjected to statistical processing as weighting coefficients, calculating the estimated resistance value by using at least the resistance value, and controlling polishing of the bar until the estimated resistance value reaches the target resistance value.

27. An apparatus for manufacturing a magnetic transducer according to claim 26,
- wherein the polishing control means obtains a dimension value of a predetermined portion of the magneto-sensitive layer on the bar under working,
- whereby the ongoing-work-information contains data about the obtained dimension value.

28. An apparatus for manufacturing a magnetic transducer according to claim 26,
- wherein the polishing control means obtains the resistance value of the at least one resistance film pattern formed as a dummy on the substrate,
- whereby the ongoing-work-information further contains data about the resistance value of the resistance film pattern.

29. Software for controlling manufacturing of a magnetic transducer, for use in manufacturing of a magnetic transducer having a magneto-sensitive layer changing in electrical resistance in response to an external magnetic field, comprising:

a step of obtaining information about at least either a predetermined substrate supporting the magneto-sensitive layer or a structure including at least the magneto-sensitive layer formed on the substrate, as substrate information before polishing; and a control step of controlling polishing each bar of a plurality of bars which the substrate is cut into, each including at least the magneto-sensitive layer, wherein the control step controls polishing of the bar based on at least the substrate information until the magneto-sensitive layer included in the bar reaches predetermined target resistance value;

a step of calculating a first value constituting a part of a potential estimated resistance value of the magneto-sensitive layer by subjecting the substrate information to a predetermined operation using values previously subjected to statistical processing as weighting coefficients; and a step of calculating the estimated resistance value by using at least the first value, wherein the control step controls polishing of the bar until the obtained estimated resistance value reaches the target resistance value.

30. Software for controlling manufacturing of a magnetic transducer according to claim 29, further comprising:

a step of obtaining information about the bar under polishing as information during working, wherein the control step controls polishing of the bar based on both of the substrate information and the ongoing-work-information.

31. Software for controlling manufacturing of a magnetic transducer according to claim 30, further comprising:

a step of calculating a first value constituting a part of a potential estimated resistance value of the magneto-sensitive layer by subjecting the substrate information to a predetermined operation using values previously subjected to statistical processing as weighting coefficients, wherein the control step calculates the estimated resistance value by using both of the first value and the ongoing-work-information and controls polishing of the bar until the estimated resistance value reaches the target resistance value.

32. Software for controlling manufacturing of a magnetic transducer according to claim 31, further comprising:

a step of calculating a second value constituting a part of the estimated resistance value by subjecting the ongoing-work-information to a predetermined operation using values previously subjected to statistical processing as weighting coefficients, wherein the control step calculates the estimated resistance value by using both of the first value and the second value and controls polishing of the bar until the estimated resistance value reaches the target resistance value.

33. Software for controlling manufacturing of a magnetic transducer, for use in manufacturing of a magnetic transducer having a magneto-sensitive layer changing in electrical resistance in response to an external magnetic field, comprising:

a control step of controlling polishing of a plurality of bars which is a predetermined substrate supporting the magneto-sensitive layer is cut into, each including at least the magneto-sensitive layer;

a step of obtaining information about a bar under polishing as ongoing-work-information; and a step of calculating a resistance value constituting a part of a potential estimated resistance value of the magneto-sensitive layer by subjecting the obtained ongoing-work-information to a predetermined operation using values previously subjected to statistical processing as weighting coefficients, wherein the control step calculates the estimated resistance value by using at least the resistance value and controls polishing of the bar until the estimated resistance value reaches the target resistance value.

34. A system for controlling manufacturing of a magnetic transducer, for use in manufacturing of a magnetic transducer having a magneto-sensitive layer changing in electrical resistance in response to an external magnetic field, comprising:

means for obtaining information about at least either a predetermined substrate supporting the magneto-sensitive layer or a structure including at least the magneto-sensitive layer formed on the substrate, as substrate information before polishing; and control means for controlling polishing of a plurality of bars which the substrate is cut into, each bar of the plurality of bars including at least the magneto-sensitive layer, wherein the control means controls polishing of the bar based on at least the substrate information until the magneto-sensitive layer included in the bar reaches a predetermined target resistance value;

means for calculating a first value constituting a part of a potential estimated resistance value of the magneto-sensitive layer by subjecting the substrate information to a predetermined operation using values previously subjected to statistical processing as weighting coefficients; and means for calculating the estimated resistance value by using at least the first value, wherein the control means controls polishing of the bar until the obtained estimated resistance value reaches the target resistance value.

35. A system for controlling manufacturing of a magnetic transducer according to claim 34, further comprising:

means for obtaining information about the bar under polishing as ongoing-work-information, wherein the control means controls polishing of the bar based on both of the substrate information and the ongoing-work-information.

36. A system for controlling manufacturing of a magnetic transducer according to claim 35, further comprising:

means for calculating a first value constituting a part of a potential estimated resistance value of the magneto-sensitive layer by subjecting the substrate information to a predetermined operation using values previously subjected to statistical processing as weighting coefficients, wherein the control means calculates the estimated resistance value by using both of the first value and the ongoing-work-information and controls polishing of the bar until the estimated resistance value reaches the target resistance value.

37. A system for controlling manufacturing of a magnetic transducer according to claim 36, further comprising:

means for calculating a second value constituting a part of the estimated resistance value by subjecting the ongoing-work-information to a predetermined operation using values previously subjected to statistical processing as weighting coefficients, wherein the control means calculates the estimated resistance value by using both of the first value and the second value and controls polishing of the bar until the estimated resistance value reaches the target resistance value.

38. A system for controlling manufacturing of a magnetic transducer, for use in manufacturing of a magnetic transducer having a magneto-sensitive layer changing in electrical resistance in response to an external magnetic field, comprising:

control means for controlling polishing of a plurality of bars which a predetermined substrate supporting the magneto-sensitive layer is cut into, each including at least the magneto-sensitive layer;

means for obtaining information about a bar under polishing as ongoing-work-information; and means for calculating a resistance value constituting a part of a potential estimated resistance value of the magneto-sensitive layer by subjecting the obtained information during working to a predetermined operation using values previously subjected to statistical processing as weighting coefficients, wherein the control means calculates the estimated resistance value by using at least the resistance value and controls polishing of the bar until the estimated resistance value reaches the target resistance value.

* * * * *